(12) United States Patent  
Tuck

(10) Patent No.: US 7,969,301 B2
(45) Date of Patent: Jun. 28, 2011

(54) PERSONAL RADIO LOCATION SYSTEM

(75) Inventor: Edward F. Tuck, West Covina, CA (US)

(73) Assignee: Social Fabric Corporation, West Covina, CA (US)

( * ) Notice: Subject to any disclaimer, the term of this patent is extended or adjusted under 35 U.S.C. 154(b) by 1273 days.

(21) Appl. No.: 11/239,603

(22) Filed: Sep. 28, 2005

(65) Prior Publication Data

US 2007/0069889 A1    Mar. 29, 2007

(51) Int. Cl.
*G08B 1/08*    (2006.01)

(52) U.S. Cl. .................. 340/539.13; 340/328; 340/326; 379/93.17; 379/93.25

(58) Field of Classification Search ............. 340/539.13, 340/328, 326, 539.1, 539.11, 825.36, 825.49; 379/93.17, 93.25; 707/2, 3, 104; 709/253
See application file for complete search history.

(56) References Cited

U.S. PATENT DOCUMENTS 6,020,810 A * 2/2000 Har-Even ...................... 340/328

* cited by examiner

*Primary Examiner* — Daryl Pope
(74) *Attorney, Agent, or Firm* — Thomas N. Giaccherini

(57) ABSTRACT

Methods and apparatus for using an energy emanating device to find a person (17*a,b*) or an object based on preselected attributes (33) stored in the energy emanating device (10) are disclosed.

6 Claims, 19 Drawing Sheets

PERSONAL RADIO LOCATION SYSTEM

The title of this Non-Provisional Patent Application is Personal Radio Location System. The Applicant is Edward F. Tuck, 2412 East Crescent View Drive, West Covina, Calif. 91791. The Applicant is a Citizen of the United States of America.

FEDERALLY SPONSORED RESEARCH OR DEVELOPMENT

None.

FIELD OF THE INVENTION

The present invention pertains to methods and apparatus for using an electronic device to find a person or system who meets criteria specified by a user and/or to establish mutual compatibility between or among two or more people or systems. More particularly, one preferred embodiment of the invention uses a small radiating device using radio, optical, supersonic or other means that automatically and continuously or periodically emits a signal which interrogates other similar devices. When the user's device finds another person or system whose device returns a signal that matches the user's pre-specified criteria, the user is alerted by a visual and/or audible signal. Alternatively, the other user's or users' device(s) might passively receive the emitted signals and give its user an indication that a criteria-meeting device is within range.

BACKGROUND OF THE INVENTION

For almost all of their existence as a separate species, humans have lived in relatively isolated groups ("hunting-gathering camps") of ten to forty people. See Tuck, Edward F. and Earle, Timothy "Why CEOs Succeed and Why They Fail," published in *Strategy and Business*, Issue 5 (Fourth Quarter 1996). The group behaviors of humans, and their bodies and senses, have evolved to fit this manner of living.

All animals, including insects and bacteria, and many plants, have some means of communicating with others of their species. The most common means use the chemical senses: taste and smell. Some of the substances that activate these senses for information transfer are called pheromones. Pheromones are defined in the *Merriam-Webster Office Dictionary* as "a chemical substance that is produced by an animal and serves especially as a stimulus to other individuals of the same species for one or more behavioral responses."

Some pheromones are sexual attractants. The few pheromones still retained by humans are specific odors that seem to be for that purpose. However, many animals use odors other than pheromones to provide far more detailed information. Researchers have found, for example, that some rodents select their mates on the basis of complementary Major Histocompatibility Complexes (MHC) defined in the *Merriam-Webster Office Dictionary* as "a group of genes in mammals that function especially in determining the Histocompatibility antigens found on cell surfaces." The MHC contributes to the animal's personal smell and provides a unique identifier of the animal. The MHC, and therefore that personal odor, also carries information on the animal's immune system. Researchers have found that many mammals, such as mice, select their mate on the basis of complementary MHCs, thus maximizing the number of different immune responses. See Boyse EA, Beauchamp GK, Yamazaki K., et al. "Chemosensory Communication—A New Aspect of the Major Histocompatibility Complex and Other Genes in the Mouse," *Journal of Oncodevelopmental Biology and Medicine*, Vol. 4 No. 1-2: pages 101-116, 1982. This makes for more disease-resistant, thus fitter, offspring. Animals with distinct MHCs are not closely related, and selection based on these criteria also avoids the hazards of consanguinity, which amplifies genetic defects. This is analogous to the human taboo against marrying one's close relatives.

The predominant pheromones among mammals are odors. These odors are produced in the skin or passed along in breath or urine. The sense of smell in free-ranging mammals is exquisitely sensitive and complex: it can identify a range of odors far greater than is required to avoid danger or seek prey. The major use of this sense is to detect and understand pheromones and to analyze the MHCs of others. To understand the profound importance of smell, one must know that the first organ to evolve after the spinal cord was an olfactory bulb at its end. The rest of a chordate's brain evolved from this base (vertebrates, including humans, are among the members of the phylum Chordata).

Unlike most mammals, humans and some apes have poor senses of smell, and also few pheromones. They have also lost their ability to detect and analyze MHC, even though their body odors still carry that information. This is best shown by the behavior of tracking dogs, who cannot distinguish between identical twins. This may be the result of the natural selection that took place in three million years of living in small camps, because they were no longer needed (human females do not have an estrus cycle like most other mammals. They are always receptive, and thus have no need to signal their receptiveness; degrees of consanguinity are public information in a small group. Camp dwellers historically found their mates in neighboring camps, which provided genetic separation; because they were usually in sight of one another, camp dwellers had no need for odors to advertise their gender, pregnancy, age, state of health and other visible features; humans in committed relationships usually adorn themselves with special marks, such as wedding rings, tattoos, hair length, and special clothing; other information on mood, such as fear, is easy to gain from the context of a person's actions).

In addition, pheromones may have been detrimental to the fitness of the camp (constant reminders of sex are distracting, and lead to jealousy and strife, which is deadly in a confined group; animals with strong odors are at more risk of predation.) Between 10,000 and 100,000 years ago, depending on the society, most hunting-gathering societies combined into either pastoral or agricultural tribes. Tribes are much larger groups, and bring two new metrics: social rank and wealth. In human society, which by then relied entirely on visual cues, clothes, posture, jewelry, tattoos and scarification were used as markers for these metrics. There was still no need for "long-distance" chemical pheromones or MHC analysis, because in a typical tribe of a few hundred people, everyone was seen by everyone else over a reasonable period of time.

In summary, identifying odors generated by the MHC, and behavior-modifying odors such as pheromones evolved and became of vital importance in creatures that were solitary or which lived in closely-related family groups. They became less important, and finally counterproductive, in species that tended to aggregate themselves into clumps of up to a few hundred individuals. In human societies the ability to detect and discriminate among those odors was essentially lost (and in some cultures the odors themselves are often intentionally suppressed, as with perfilme and frequent bathing) and were replaced by their visual equivalents, some of which were eventually suppressed by clothing.

Modern urban society is radically different from life in a tribe or hunting-gathering camp, especially for singles. In 2005, over 30% of the households in the United States are inhabited by "single" people: unmarried people, married people living apart from their spouses, and single-parent households with small children. Specifically, in the year 2000, the United States had a population of 281 million, of which 224 million, or about 80%, lived in cities or metropolitan area of 100,000 or more people. These people lived in 105 million households, of which 33 million, or 31%, were non-family households (up from 26% in 1980), and 27 million, or 26%, were one-person households (up from 23% in 1980). See U.S. Census Bureau, *Statistical Abstract of the United States:* 2001, (121st edition) Washington, D.C. 2001.

Unlike his or her ancestors in a tribe or camp, the average person in the United States has a very poor chance of meeting a compatible stranger, either for friendship or matrimony, without exposure to embarrassment or danger. The traditional mechanisms for singles to meet are attendance at churches and bars; in the first case, it is considered bad form to "go shopping" from church to church, and in the second, there is very little protection against predators and chemically impaired judgment, and no mechanism to filter the compatible from the incompatible.

Note that while this analysis is, for simplicity's sake, cast in terms of singles seeking singles, it is recognized that in urban areas, families which would like to establish social contact with other families suffer an even greater disadvantage because of their lower mobility and more complex selection criteria. In addition, purely inanimate objects, such as cranes and containers in a shipyard, can benefit from a mechanism that establishes mutual compatibility on a peer-to-peer level, without intervention of clerks or computers.

Many individuals have difficulty finding a mate. According to www.eHarmony.com, 21 million Americans spent $313 million dollars last year on Internet dating services. There are many other services similar to eHarmony.com, such as Match.com in the United States and Soulmates in the United Kingdom.

These are efficient, profitable and useful services. They not only find and filter acquaintance candidates, but also provide a sanctioned (though virtual) arena, like a church or small private party, in which strangers can meet without danger or embarrassment. They have the disadvantage of being cumbersome, time-consuming, and involving an elaborate contact ritual designed to avoid disappointment, embarrassment and danger; and the element of spontaneity, in which the best decisions are often made, is missing. See Gladwell, Malcolm, *Blink: The Power of Thinking Without Thinking*, Little, Brown & Co., 2005.

There is also the disadvantage that online selection does not correspond well to the selection process that takes place in real-life acquaintance scenarios. Recent studies involving "Instant Dating" tests have shown that physical appearance is by far the most important consideration in the early stages of acquaintance. This is true for both genders (though more so for men). Therefore, an acquaintance process that does not quickly include face-to-face contact is somewhat artificial.

Since it does not appear that natural pheromones and odors are greatly effective in helping men and women find each other, it would be extremely helpful if some type of man-made device could help enable people to find friends or mates based on specific criteria, retaining some of the precision and safety of the online dating sites, while maintaining the efficiency and naturalness of the church and the bar. It would also help to avoid some of the abusive and demeaning behavior now invading the dating process. See Netburn, Deborah, "Danger: Pickup Artists Ahead," *Los Angeles Times*, Wednesday, Aug. 10, 2005, p. E1.

The development of such a device or system would constitute a major technological advance, and would satisfy long-felt needs and aspirations in the Internet dating industry.

SUMMARY OF THE INVENTION

The present invention provides a simple miniaturized electronic device that enables individuals to find a friend, a mate or someone with a specific interest or skill. In one embodiment of the invention, a man or a woman may program a MateFinder™ to help find an ideal match. In one particular embodiment, the MateFinder™ comprises a radio and a microprocessor with a non-volatile memory, such as a static RAM. Information that describes both the user and the ideal match can be written to the non-volatile memory. The radio automatically and periodically broadcasts a "seeking signal" over a short range. When the seeking signal is received by another MateFinder™, it is analyzed to determine the degree of correlation with the receiver's preferences. If the degree of correlation exceeds a preset minimum, the sender, the receiver, or both are alerted.

An appreciation of the other aims and objectives of the present invention, and a more complete and comprehensive understanding of this invention, maybe obtained by studying the following description of preferred and alternative embodiments, and by referring to the accompanying drawings.

A BRIEF DESCRIPTION OF THE DRAWINGS

FIG. 1 offers a view of men and women attending a party. The man has a MateFinder™ clipped to his belt. Some of the women at the party have a MateFinder™ clipped to a purse or belt, or concealed in her clothing. The man's MateFinder™ produces a short-range radio signal that interrogates other MateFinders™ that are nearby. The interrogation signal may broadcast a description of the man and seeks another MateFinder™ that stores a list of qualities, characteristics or criteria that describe the gentleman's aspirations, preferences or requirements in a mate. When the interrogation signal finds a good match, the man is alerted by a visual or audible alert. If the man's own attributes match those sought by one of the women, the MateFinder™ may alert her to the presence of the man.

FIG. 2 supplies a perspective view of one particular embodiment of the invention, which may be clipped to a man's belt or to a lady's purse, or which may be concealed in the clothing of either. The MateFinder may also be incorporated into a bracelet, watch, necklace, tietack, shoe, hat or some other fashionable item or article.

Figure 6:
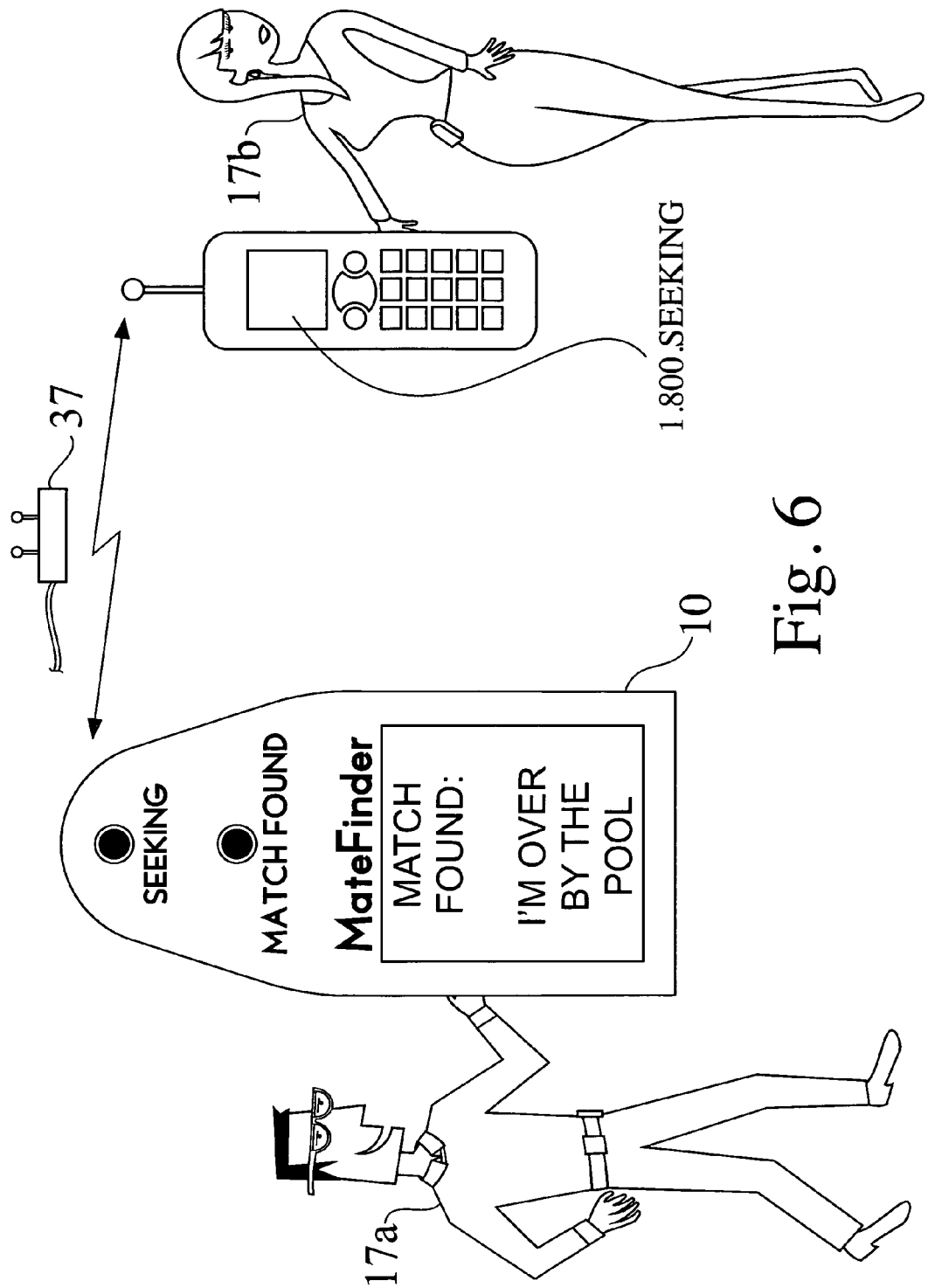

FIG. 6 exhibits the operation of a pair of MateFinders™. When the man's device finds a woman's MateFinder™ that presents a good match, his device alerts him. In an alternative embodiment, the woman may respond by using her cellular telephone to send a message back to her prospective match.

Figure 7:
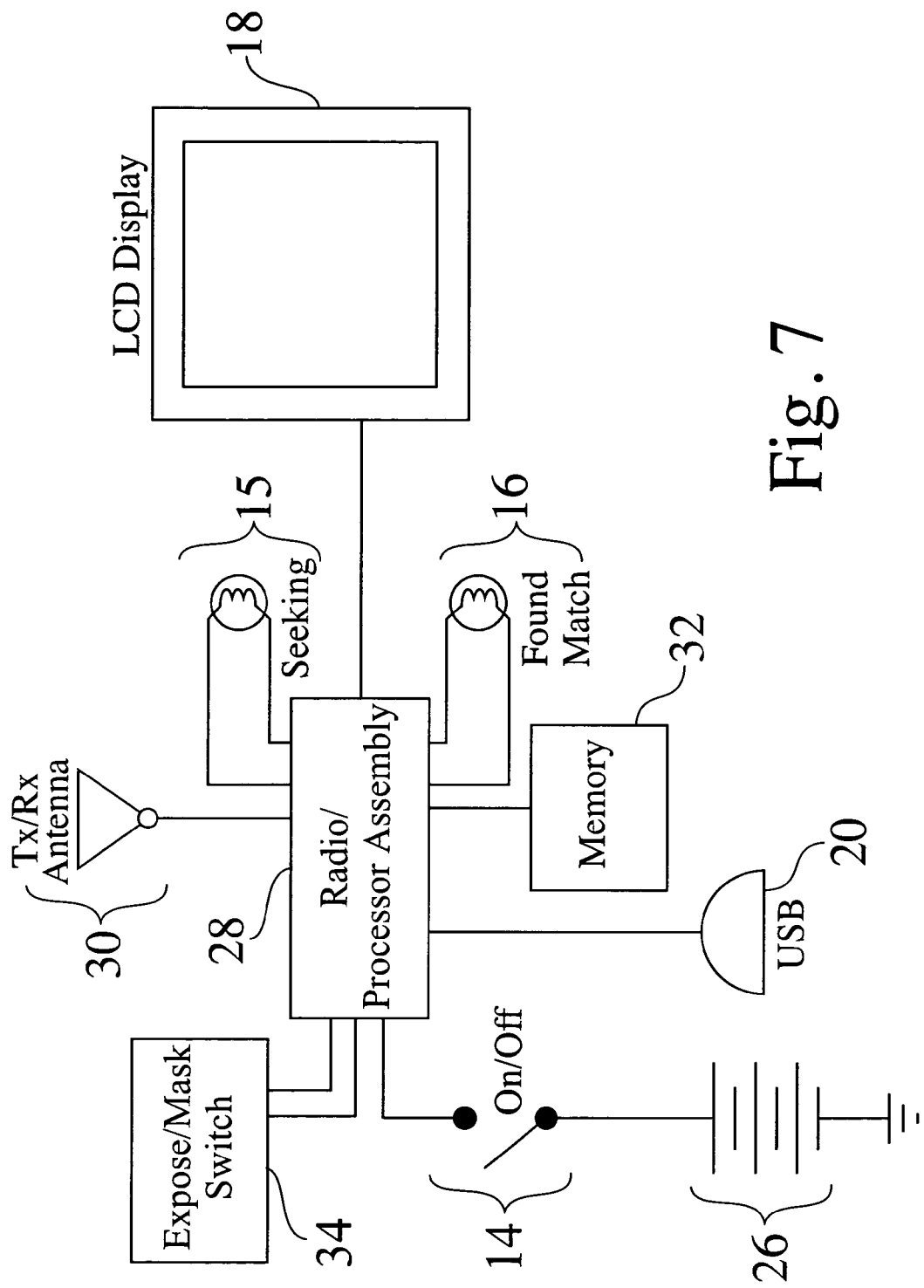

FIG. 7 is a simplified schematic diagram of one embodiment of the present invention.

Figure 8:
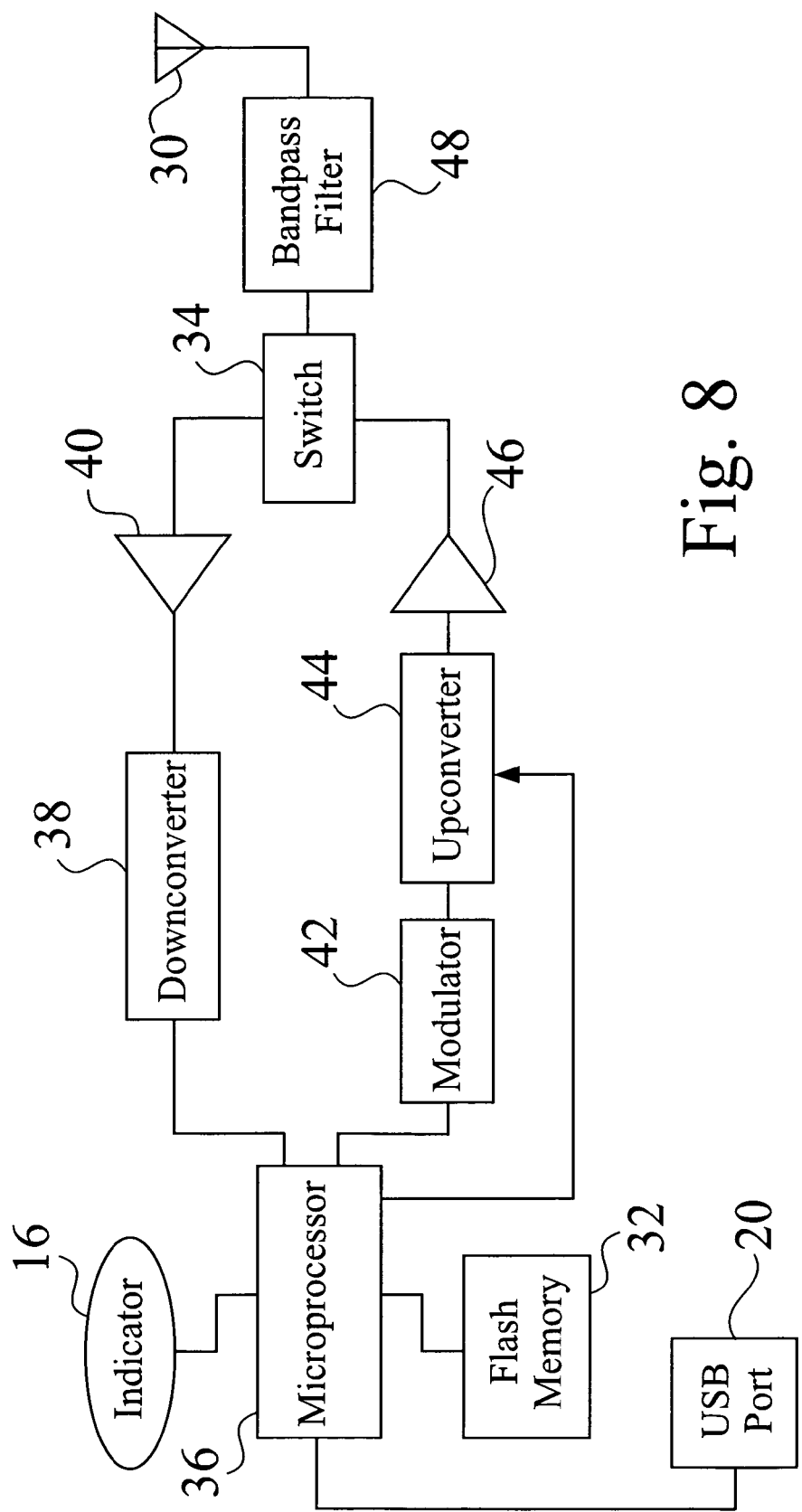

FIG. 8 is a more detailed schematic diagram which exhibits a particular implementation of the present invention.

Figure 9:
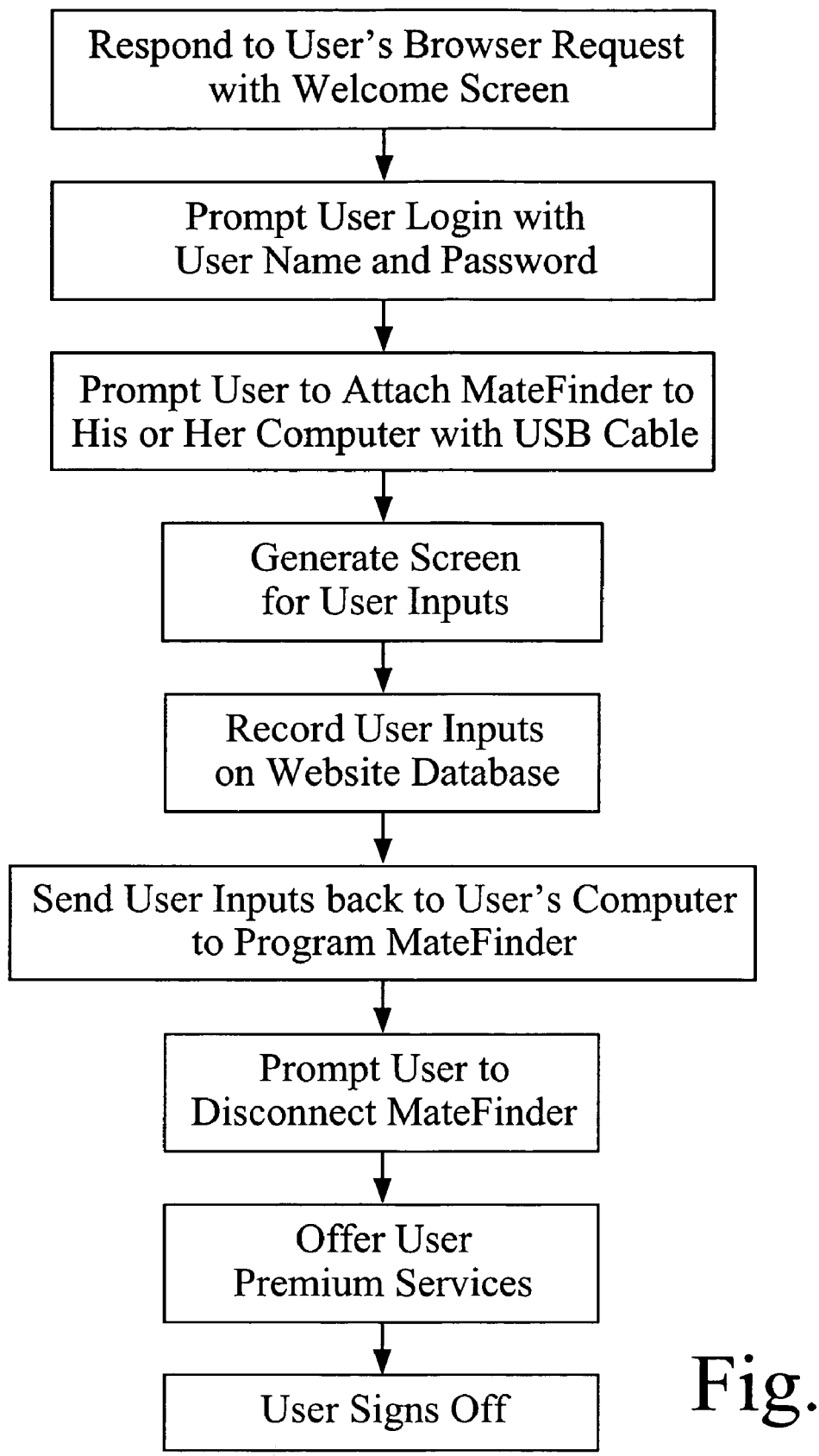

FIG. 9 is a flow-chart that outlines a basic design for a software program that may be utilized in one embodiment of the invention. FIGS. 10, 11, 12, 13, 14, 15, 16, 17, 18 and 19 summarize several various implementations and applications of the present invention.

A DETAILED DESCRIPTION OF PREFERRED & ALTERNATIVE EMBODIMENTS

I. A Preferred Embodiment of the Invention

The present invention comprises methods and apparatus for finding someone or something with specific attributes using a radio device. In one embodiment of the invention, a MateFinder™ 10, which resembles a pager, may be used by a man or a woman to find a match.

Figure 1:
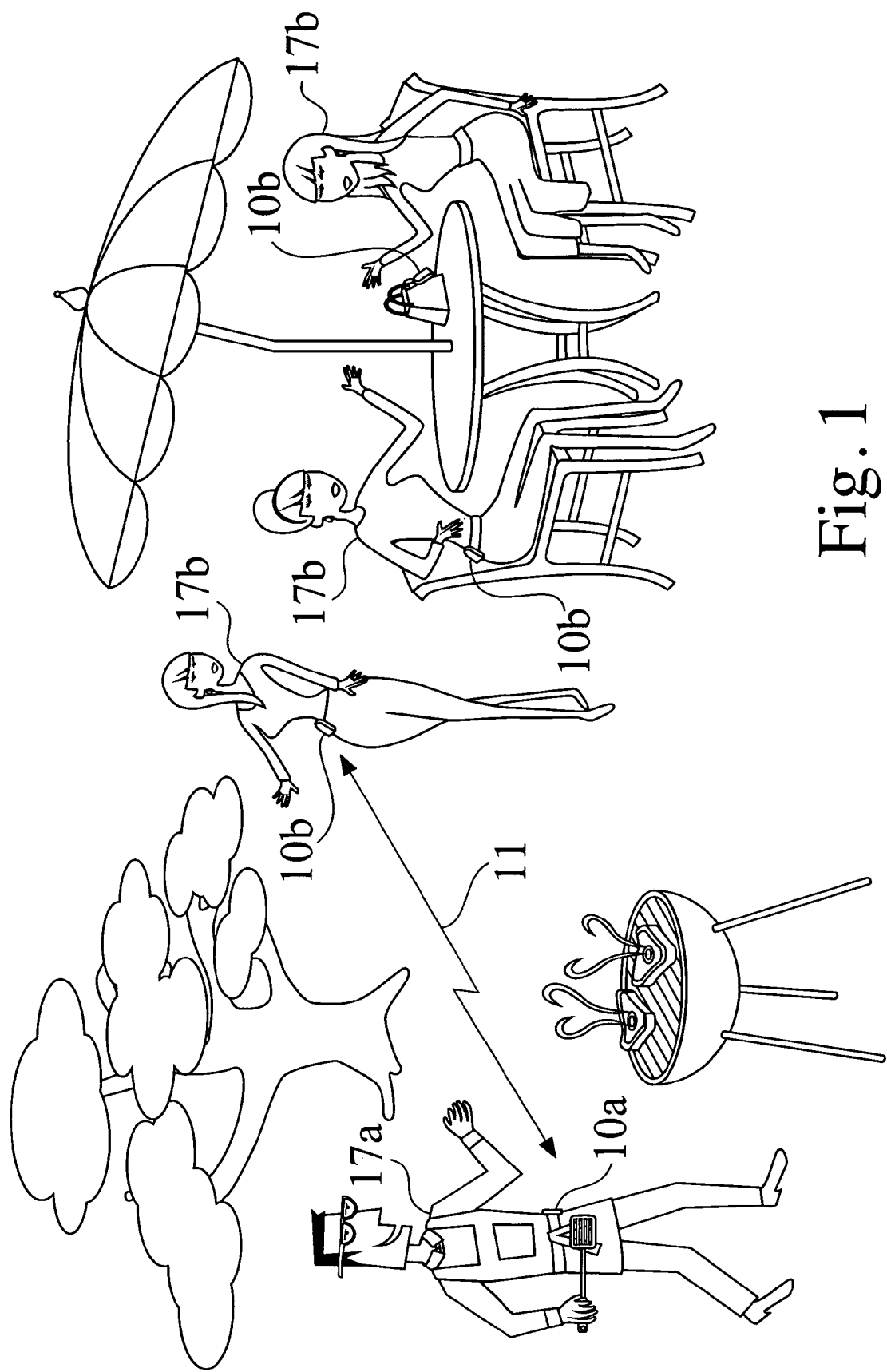

FIG. 1 is a representation of a private party. One of the hopes of some of the men and women who attend the party is that of finding a friend or a mate. In accordance with one embodiment of the present invention, a man 17a is shown wearing a MateFinder™ 10a clipped to his belt. A group of women 17b standing around or sitting at a table also have MateFinders 10b, which are clipped to their belts or purses or are concealed in their clothing. In general, the MateFinder™ 10 is an electronic device which uses a radio to help find someone or something which fits a predetermined description or some preselected criteria. In this Specification and in the Claims that follow, the MateFinders 10 are generally identified as 10a when used by a man or an unspecified "first user" 17a, and as 10b when used by a woman or unspecified "second user" 17b. The use of the reference characters ending in "a" and "b", which are also recited in the Claims as the "first" and "second" transceivers, 10a and 10b, are intended to assist the reader in understanding the invention, but do not connote any substantive differences in the device 10.

The man's MateFinder™ 10a continuously emits an automatic and generally continuous radio seeking or interrogation signal 11. This signal 11 illuminates or interrogates other MateFinder radios that are within range. The man 17a has programmed his MateFinder 10a with a set of attributes that describes himself, and this information is conveyed by the signal 11 emitted by his MateFinder. This signal 11 may also convey a description of the woman that he is interested in finding. If the man's MateFinder signal finds a woman who fits his preselected set of criteria, his MateFinder issues a visual and/or audible alert. If the man's MateFinder signal contains a description that matches the woman's predetermined description of a suitable man, the woman's MateFinder alerts her to his presence. The location and/or identity of each person carrying the MateFinder is not initially available to the users. For example, in one possible use, exemplars of the device would be worn (possibly concealed) by a number of users attending a large private party or public function. Each user's MateFinder would emit its own interrogation signal, for example, first interrogation signal 11a, and second interrogation signal 11b. Users would be alerted to the presence of compatible types, along with an indication of the degree of correlation found and whether a selected matching signal's position is masked. The user would then have the option of unmasking his or her position to the emitter of a specific signal, possibly by changing the modulation scheme to one that allows its strength to be detected. Users could then approach each other by maximizing their indication of the other's signal strength. It should be possible to see the target person at a safe distance before making further contact. The present invention reduces the risk that is inherent in Internet or other forms of remote or electronic dating by allowing a user to evaluate a prosective match in person before initiating contact.

Figure 2:
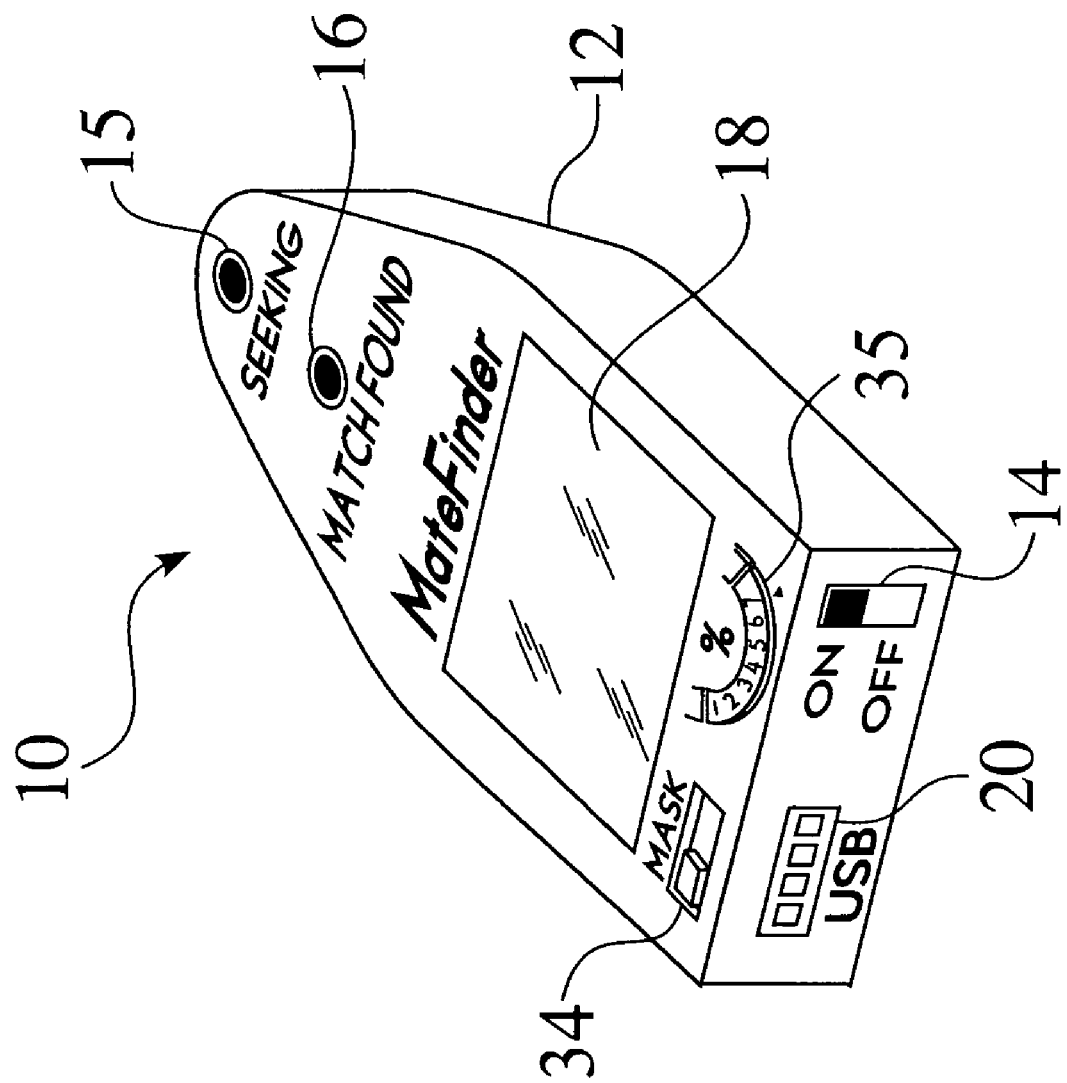

FIG. 2 furnishes a perspective view of one embodiment of the MateFinder device 10. A housing 12 made of plastic or some other suitable material encloses a radio (not shown in FIG. 2). A power switch 14 is located on the base of the housing 12. When the power switch 14 is turned to the "ON" position, an LED 15 labeled "SEEKING" flashes periodically to indicate that the MateFinder™ 10 is emitting a signal. When the MateFinder™ finds a match, an LED 16 labeled "MATCH FOUND" is illuminated. The illumination of the "MATCH FOUND" LED 16 may be accompanied by an audible alarm or tone, vibration or some other suitable means for alerting the user. In an embodiment in which two MateFinders 10 are used, each MateFinder includes a match indicator, 16a and 16b. A miniature LCD screen 18 is situated on one side of the MateFinder 10. This screen 18 is used to read messages which may be sent by the person who is detected by the seeking signal 11, or to view a list of possible matches detected by the MateFinder. A USB 20 or some other suitable port for connecting the MateFinder 10 to a personal computer or some other appliance or device is located on the base of the device. In an alternative embodiment, the USB port 20 may be replaced or enhanced by a wireless connection. A "Mask" switch 34 enables the user to allow the matching MateFinder to locate him or her by electronic means. A correlation switch 35 enables the user to adjust the level of matching that is performed by the MateFinder. For example, if the user turns the thumbwheel 35 toward the "10" indicator on the wheel, he or she is instructing the MateFinder to seek out a stronger or higher level of correlation between the preselected qualities or attributes stored in his or her MateFinder and a potential candidate. By turning the thumbwheel 35 down towards "1", the MateFinder reports matches that represent lower levels of correlation between preselected attributes and candidates.

In alternative implementations of the invention, the MateFinder 10 may be built into a bracelet, a necklace, a tie-clip, a hat, a shoe or some other suitable fashion item, article of clothing or ornament.

Figure 3:
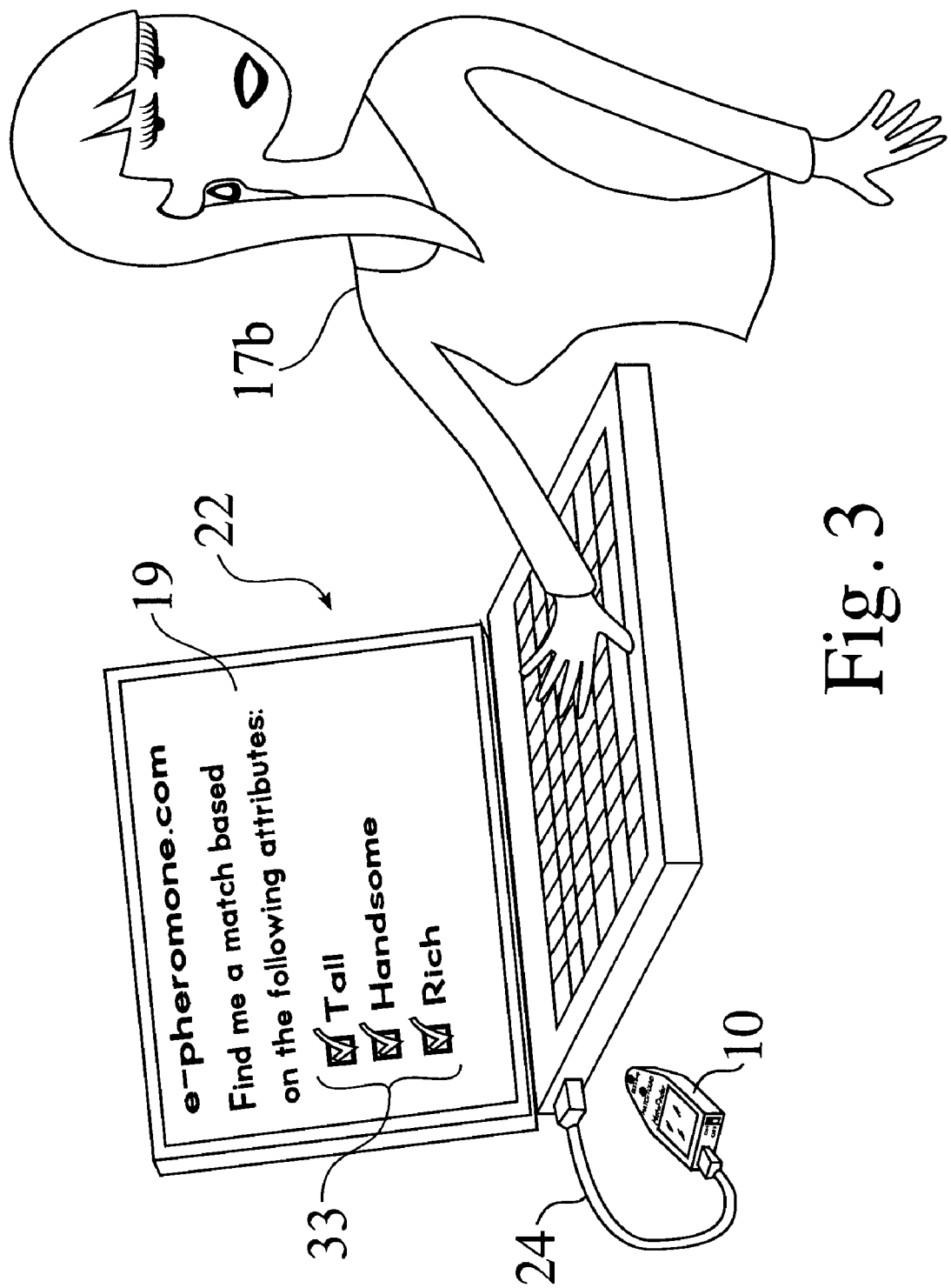
FIG. 3 illustrates a woman who has visited a website, www.e-pheromone.com, using her personal computer. She has connected her MateFinder™ device to the USB port of her computer, and is programming her MateFinder™ with her own attributes, as well as with her preferences in a mate.

FIG. 3 depicts a woman 17b who has visited a website 19, www.e-pheromone.com. After connecting her MateFinder 10b to the USB port of her personal computer 22 with a cable 24, she is able to program her MateFinder 10b with two sets of attributes 33: a first set of attributes 33a that describes herself, and a second set of attributes 33b that describes her ideal mate. In general, an attribute is any form of data, criteria, information, measure of suitability, complementarity or compatibility; qualities or characteristics that describe a person, item, system, device or thing being sought by a user of the present invention. In one embodiment, two sets of attributes are employed, a first 33a, which pertain to the "seeking" user, and a second 33b, which pertain to the "target" user. Both of these sets of information may be entered into the personal computer 22 in response to prompts from the pages of the website 19. Software running on a server (not shown) which hosts the website then sends the data back to the woman's computer 22, where it is conveyed to the attached MateFinder 10 over the USB cable 24. In an alternative embodiment, the connection between the personal computer 22 and the MateFinder 10 may be wireless.

The attributes 33 which may be selected by the user are virtually unlimited. In the case of a dating service, attributes 33 may be selected from an existing list of attributes 33. As an example, Table One presents attributes 33 which the website 19 displays may include:

TABLE ONE

| Category | Attribute |
| --- | --- |
| Gender | Male, Female |
| Age | |
| Appearance | Handsome/Knockout, Attractive/Cute |
| Marital history | Single, Divorced |
| Residence location | |
| Height | Tall, Average, Short |
| Weight | |
| Hair Color | Blonde, Brunette, Redhead |
| Occupation & Income | |
| Religiosity | Yes/No; Denomination |
| Political preferences | Conservative, Liberal, None |
| Interests or hobbies | |
| Educational level | |
| Social Class Marker | |

In this "electronic dating" embodiment, the user generally selects two sets of attributes 33—a first set 33a to describe herself or himself, and a second set 33b to describe his or her ideal match. In another embodiment, the user may only select one set, either only attributes that describe herself 33a, or only attributes that describe a mate 33b. A set of attributes 33 may include any number of qualities, numbering from one to a large number. Both sets of attributes 33 are stored in a non-volatile memory that is housed within the MateFinder 10. In one embodiment of the invention, one MateFinder 10a with a first memory 32a is employed to find a second MateFinder 10b with a second memory 32b. These preselected attributes may be revised by visiting the website 19, or may be generated using a software template provided with the MateFinder, which is then reprogrammed to incorporate the new data. In an alternative embodiment of the invention, the MateFinder 10 may be programmed directly using voice commands, or by using a keypad built into the device (not shown).

Figure 4:
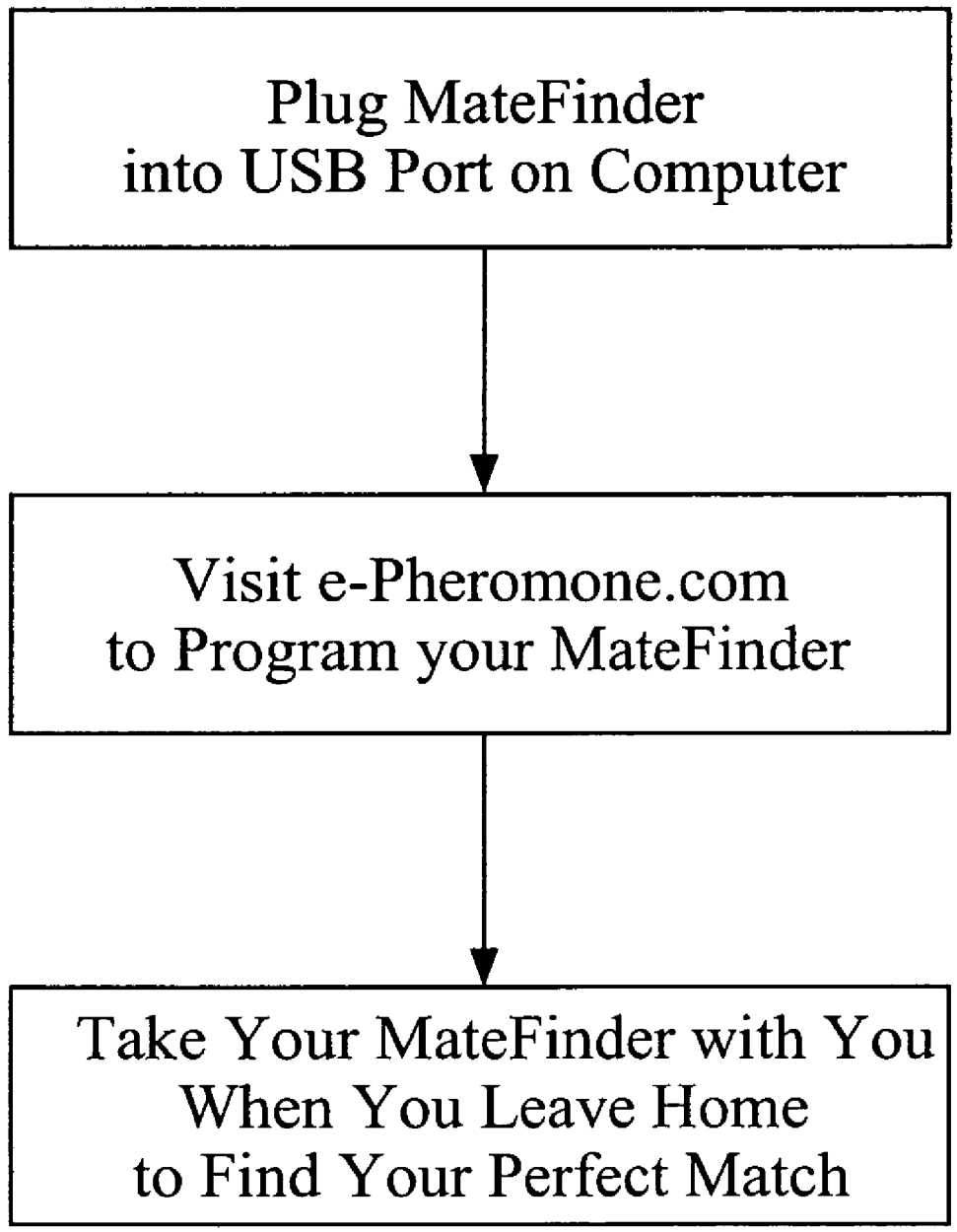
FIG. 4 is a flowchart that explains how a user employs the MateFinder™ to help find a person with characteristics that match the user's preferences.

FIG. 4 offers a basic flowchart that describes how this embodiment of the invention is used. After acquiring a MateFinder 10, the user connects it to a personal computer 22. The user visits a website 19 to select two sets of attributes 33 that are stored in his or her device, or uses a software template supplied with the MateFinder. When he or she is ready to enter a social setting, or simply leaves home, he or she then turns the MateFinder on, and takes it along.

Figure 5:
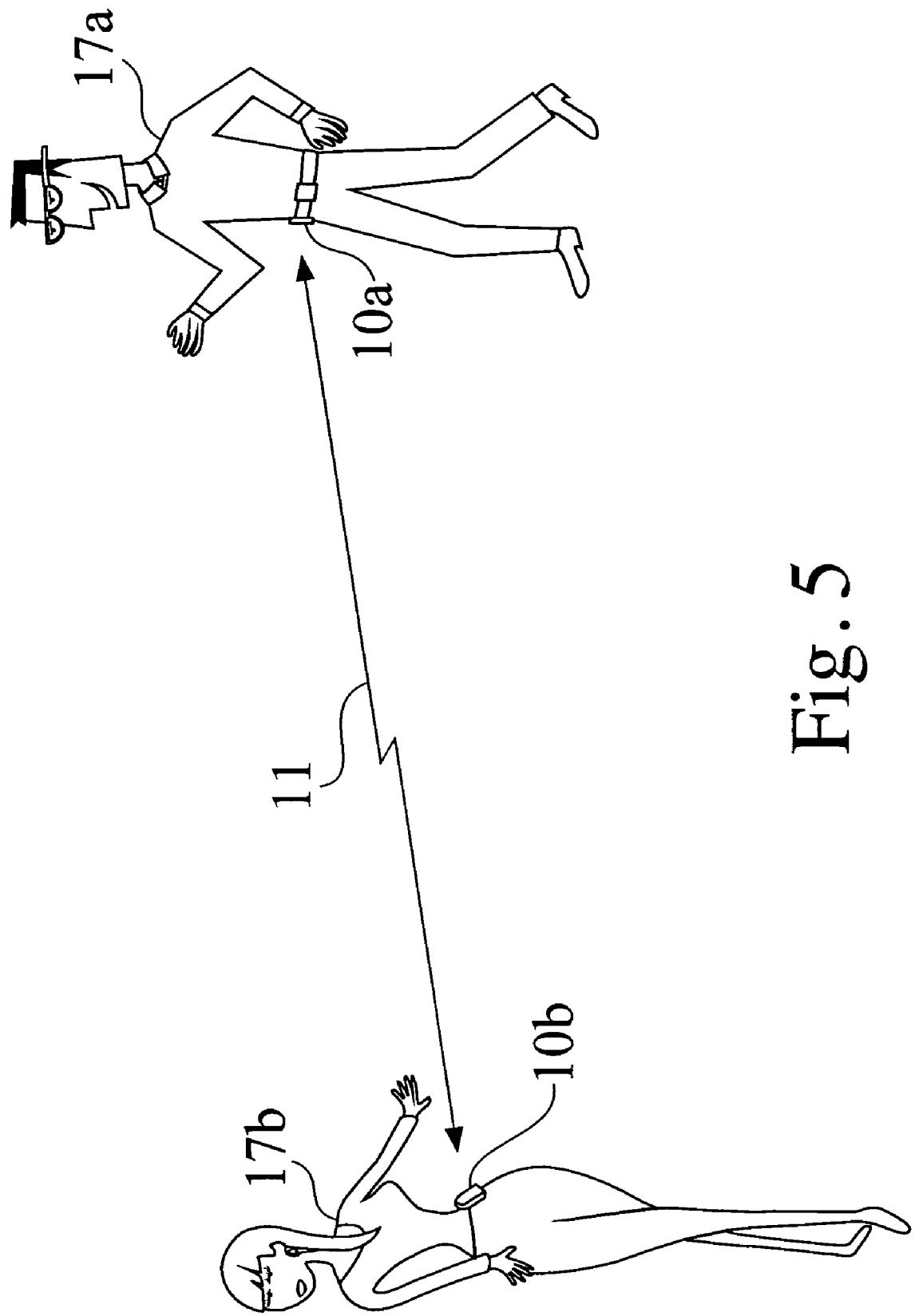
FIG. 5 shows the same woman at some sort of social event among a number of men, perhaps at the beach, in a park, at a concert or attending a sporting event. The woman's MateFinder™ has found a match in the crowd, and alerts her to his presence.

As shown in FIG. 5, the automatic and continuous seeking signal 11 finds a match. The woman 17b shown in FIG. 5, who may be attending a party, a concert or a sporting event, finds a match 17a based on her preselected attributes 33.

FIG. 6 reveals the operation of a more complex embodiment of the invention. After a man's MateFinder 10a has located a suitable match 17b, the man's MateFinder 10a conveys an address or some other identification message to the woman who has been matched. Her message may appear on the screen 18 of his device 10a. The woman 17b then has the option to communicate with the man 17a immediately. In one embodiment of the invention, the woman 17b may use her cellular phone to call a toll free number, such as 1.800.SEEKING. The address or identification information which has been sent to her MateFinder 10b by the man's MateFinder 10a is displayed on her LCD screen 18. After dialing the toll-free number, she enters this address or identification information, and is then prompted to enter a text message, or to record a voice message.

FIG. 7 is a simplified schematic diagram of the circuitry that may be employed to implement one embodiment of the present invention. The power switch 14 controls the flow of energy from a battery 26 that powers the MateFinder 10. When the MateFinder 10 is turned on, a radio/processor assembly 28 automatically and continuously emits a seeking signal 11 using antenna 30 over a short range. An USB port 20 is connected to the radio/processor assembly 28. The antenna 30 may be contained within the housing 12. When the radio/processor assembly 28 is broadcasting, the "SEEKING" LED 15 flashes periodically. When a match is found, the "MATCH FOUND" LED 16 illuminates, or some other audible or vibrating alarm is activated. The radio/processor assembly 28 is also connected to the LCD screen 18, which may be used to display short text messages from that are received from another MateFinder 10.

The radio/processor assembly 28 is also connected to a memory 32, which is used to store attributes that describe the user and his or her ideal mate. The memory 32 may comprise any suitable non-volatile device, including, but not limited to a flash memory or hard-drive. In an alternative embodiment, a "MASK" switch 34 may be included to allow the user to mask his or her location.

A suitable frequency for the radio emissions, such as one of the unlicensed "ISM" or "RF device" bands set aside by the United States Federal Communications Commission, is selected to avoid creating unwanted interference. The MateFinder 10 may be configured to emit and/or receive a variety of signals or emanations of energy. In the United States, some embodiments of the invention may use the 900 Mz, 2.1 GHz, 5.8 GHz, 59-64 GHz or some other radio frequency band. In other countries, other suitable frequency bands may be selected for the operation of the present invention. Other embodiments of the invention may employ light energy, voice commands, audible tones or ultrasonic emissions; mechanical, physical or chemical manifestations; radioactivity, or any other suitable means for communication.

In a more advanced embodiment of the invention, some or all of the discrete components described in FIG. 7 may be integrated on a single computer chip.

FIG. 8 provides a schematic diagram that illustrates one particular implementation of the invention. A microprocessor 36 is connected to a flash memory 32, a USB port 20 and an indicator 16. The microprocessor 36 is also connected to a downconverter 38, a modulator 42 and an upconverter 44. The outputs of the downconverter 38 and the upconverter 44 are connected through amplifiers 40 and 46 to a mask switch 34, which, in turn, is connected to a bandpass filter 48 and an antenna 30.

FIG. 9 offers a flowchart which depicts the basic operational steps of a particular software program that may reside at the website 19 used by the present invention. In the first step of the process, a user visits the website 19, such as e-pheromone.com. The user's browser requests information from the website 19, and the website responds by sending the user a welcome screen. The welcome screen invites the user to either create a new account, or to login to his or her existing account with a username and a password.

After the user has logged in for the first time, a new screen prompts the user to attach his or her MateFinder to his or her computer with a USB cable. After the user's computer has reported back to the website that the MateFinder is connected, the website generates a new screen that prompts the user to program his or her MateFinder using menu selections and/or a set of input fields.

After the user completes the selections, this information is recorded on a website database, and the website 19 sends the data back to the user's computer in a form that may be recorded in the MateFinder's memory. The user then disconnects the MateFinder, and may be offered a variety of premium services, such as background checks, certification of attributes or compatibility analysis, before he or she logs off.

In another alternative embodiment of the invention, the MateFinder may be designed to work in combination with an existing WiFi or similar wireless network 37 that is operating in the place where the user happens to be located. The user would be able to employ the wireless LAN or wired network (via a cable to the MateFinder), and would then be able to take advantage of all the connections offered by the Internet.

II. Applications & Uses of the Invention

FIGS. 10, 11, 12, 13, 14, 15, 16, 17, 18 and 19 summarize the various combinations of uses of the present invention. FIGS. 10 through 19 use a convention common in the communications industry when describing secure communication systems, in which there are three humans or systems involved in the transaction. The originator is called "A" or "Alice," regardless of whether it is a man, woman or system; similarly, the first intended recipient is "B" or "Bob." A third person or system, which may be attempting to eavesdrop, is called, "Eve."

The attributes 33 that describe Alice or Bob are called labeled "attributes," sometimes abbreviated "A." The attributes 33 that describe the entity that Alice or Bob is seeking are called "preferences," sometimes abbreviated P. When used in FIGS. 10-19, preferences are subsets, meaning that they are intended to be understood as members of the larger set of attributes 33. Thus, for example, the attributes that Alice uses for self-description are sometimes abbreviated "A's As," and the attributes Alice seeks are called, "A's Ps."

Each of the embodiments shown in FIGS. 10-19 are provided only as examples of the many possible uses of the present invention, and are not intended to circumscribe or limit the scope of the Claims.

Figure 10:
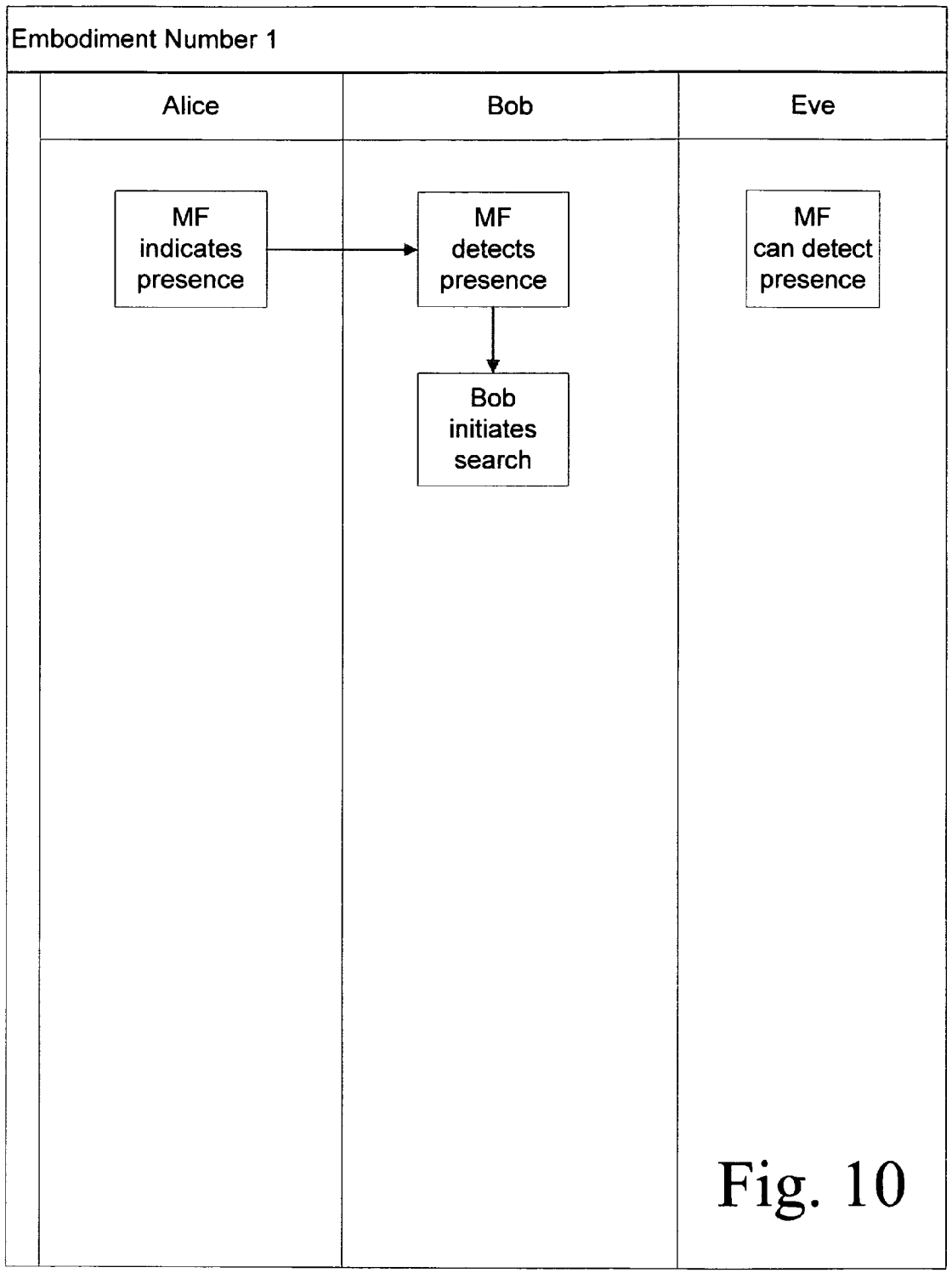

In Embodiment Number 1, shown in FIG. 10, Alice's MateFinder simply indicates her presence in the vicinity. Bob's MateFinder detects that information and alerts Bob, who may initiate a search. Eve's and other MateFinders in the area can detect the presence of Alice's MateFinder.

Figure 11:
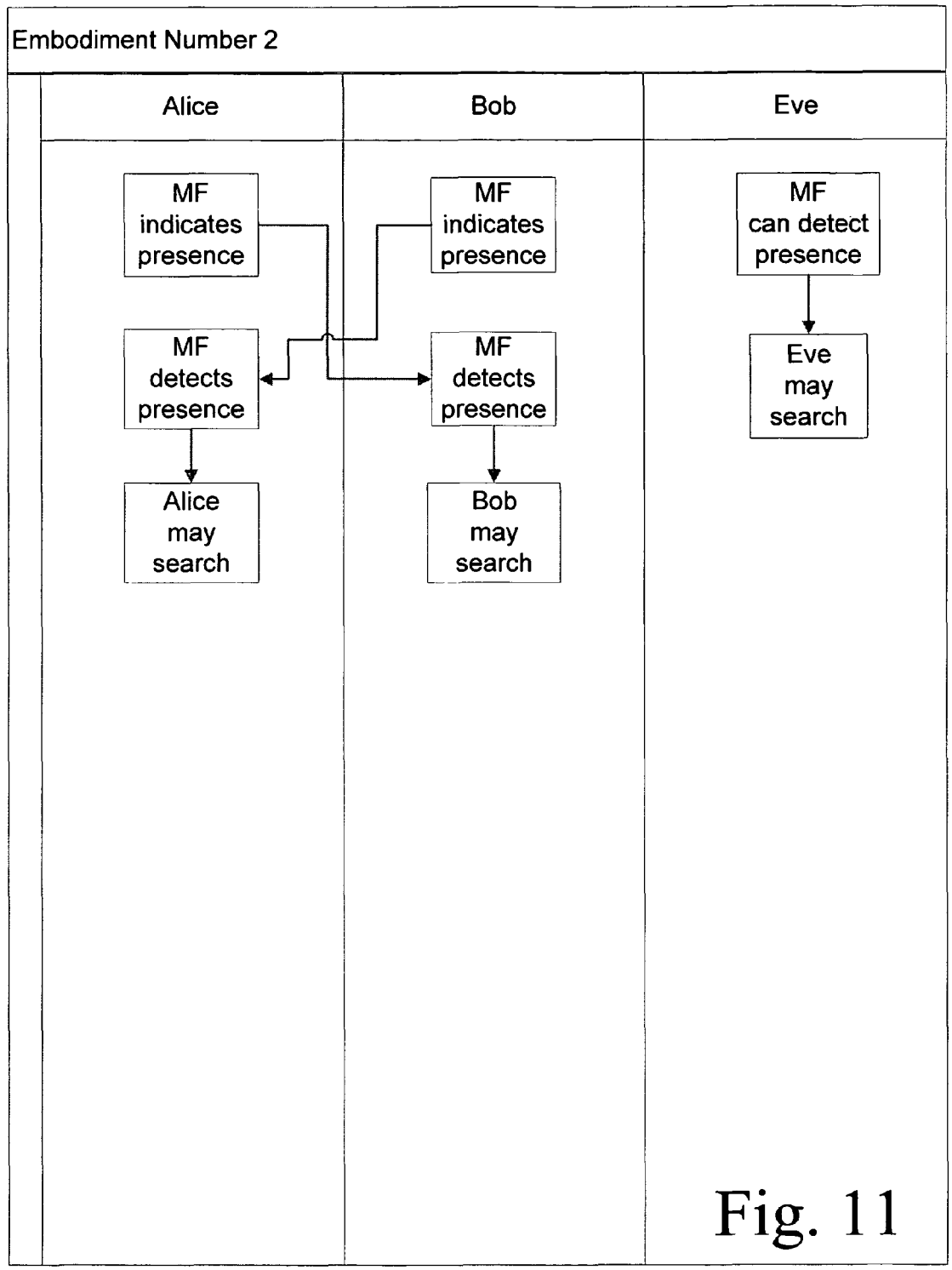

In Embodiment Number 2, shown in FIG. 11, both Alice's and Bob's MateFinders simply indicate their presence in the vicinity. Alice's and Bob's MateFinders detect that information and alert their wearers, who may initiate a search. Eve's and other MateFinders in the area can detect the presence of Alice's and Bob's MateFinders.

Figure 12:
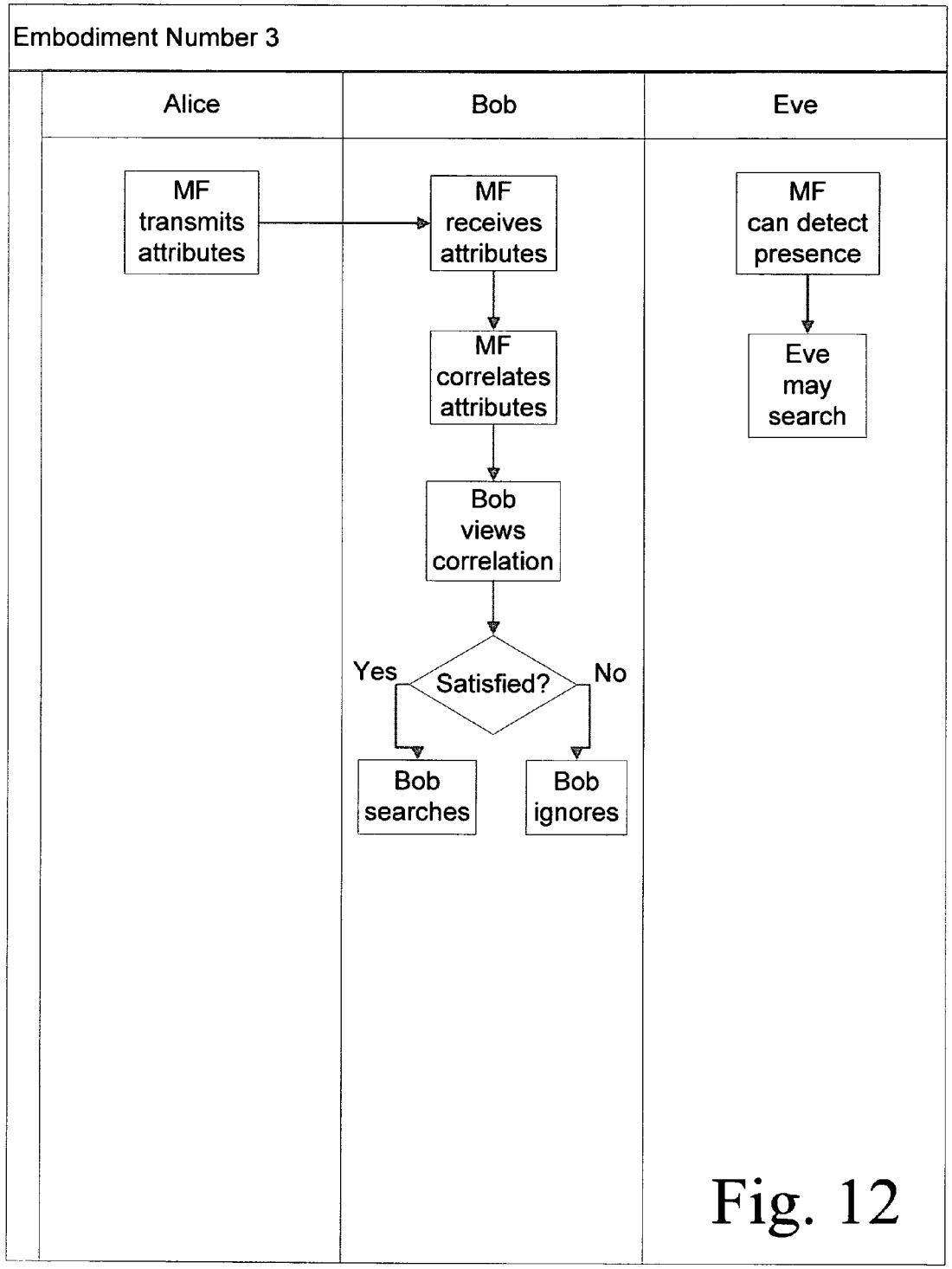

In Embodiment Number 3, shown in FIG. 12, Alice's MateFinder broadcasts Alice's attributes. Bob's MateFinder receives this information and correlates the received attributes with Bob's preferred attributes (hereafter called preferences). Bob views the degree of correlation and decides whether to initiate a search based on that information. Eve's and other MateFinders in the area can detect the presence of Alice's MateFinder.

Figure 13:
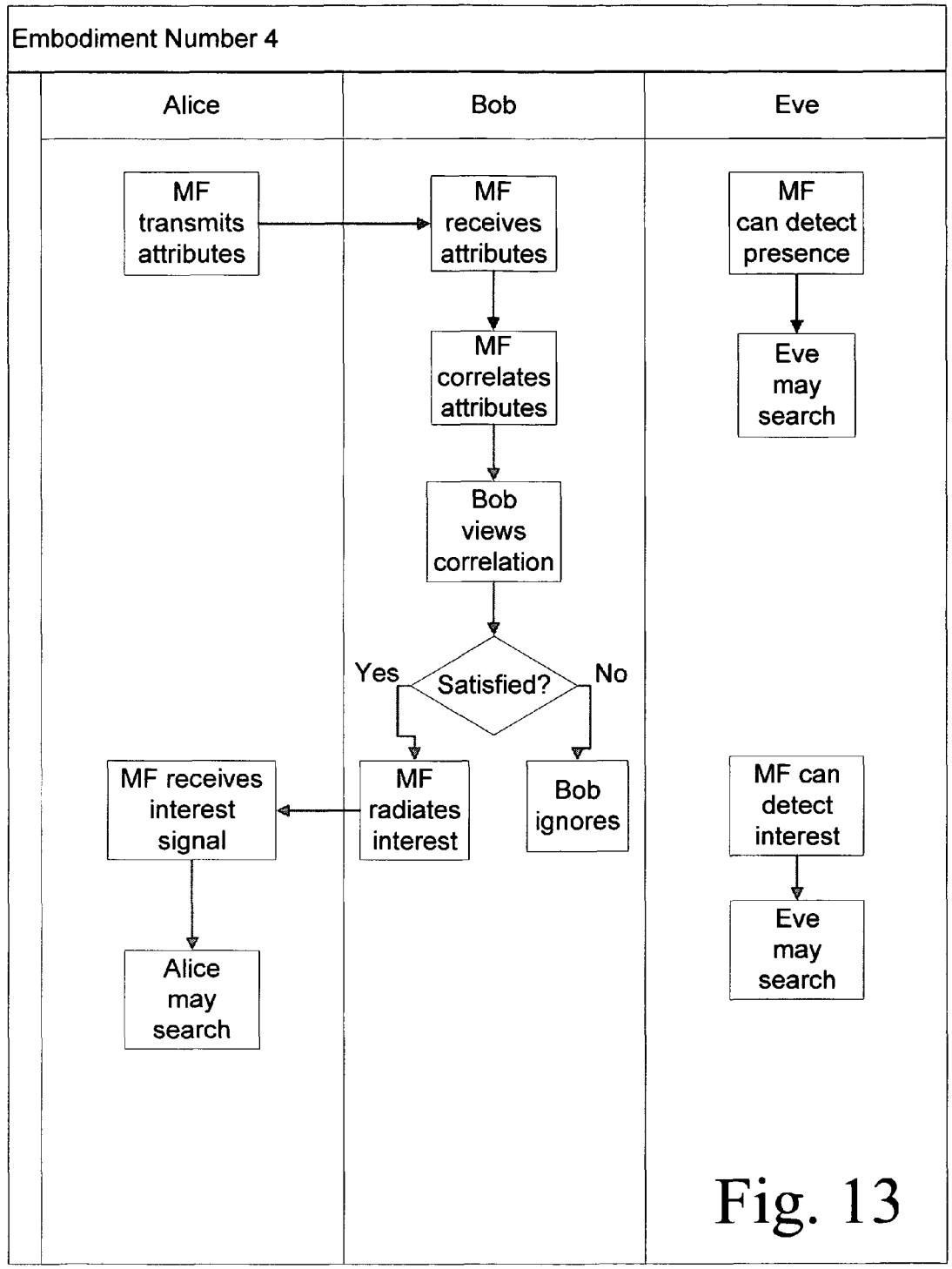

In Embodiment Number 4, shown in FIG. 13, Alice's MateFinder broadcasts Alice's attributes. Bob's MateFinder receives this information and correlates the received attributes with Bob's preferred attributes (hereafter called preferences). Bob views the degree of correlation and decides whether to have his MateFinder radiate an interest signal. If Alice detects that signal, she may initiate a search based on that information. Eve's and other MateFinders in the area can detect the presence of Alice's and Bob's MateFinders, and can detect the interest signal when emitted.

Figure 14:
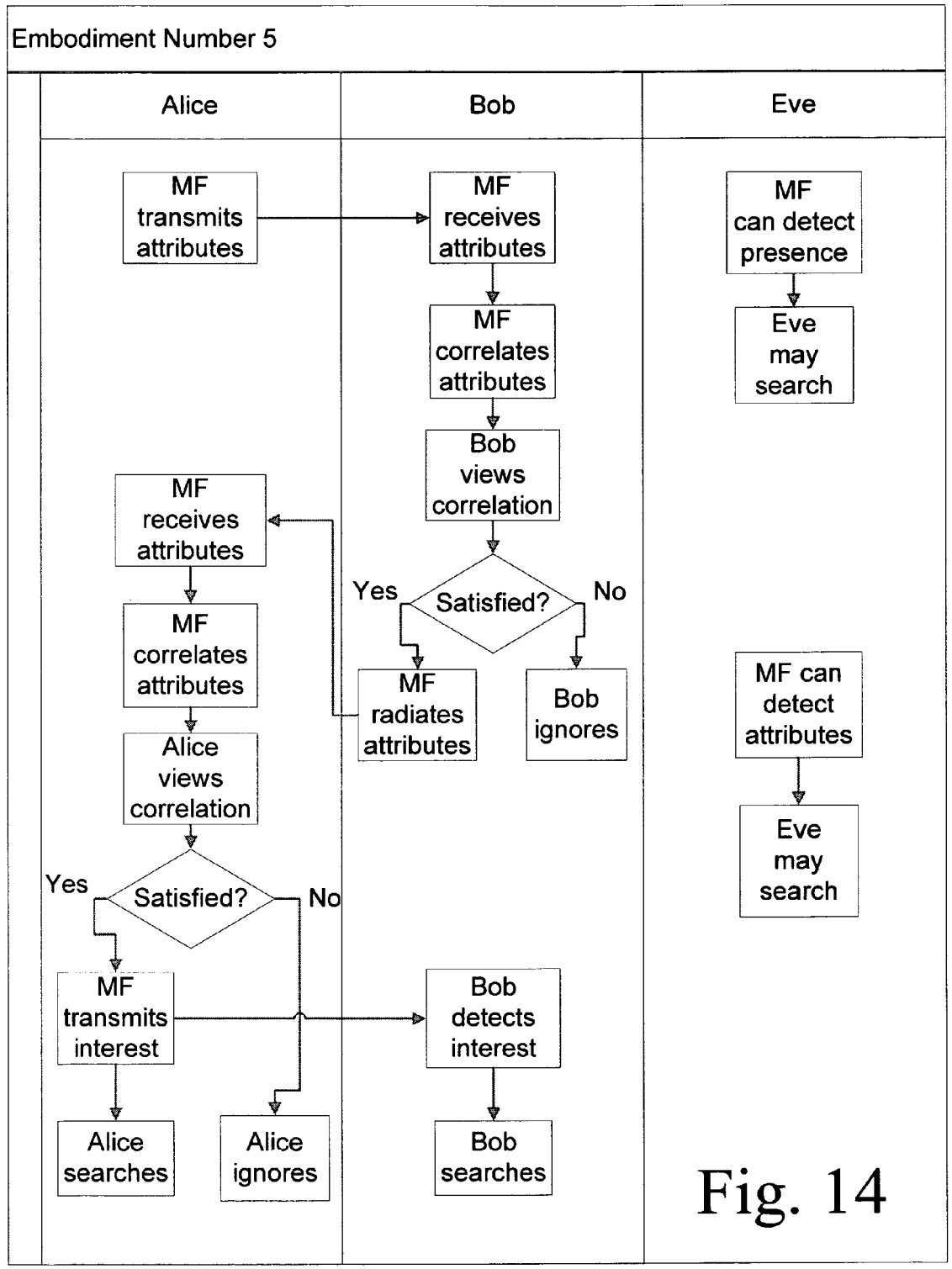

In Embodiment Number 5, shown in FIG. 14, Alice's MateFinder broadcasts Alice's attributes. Bob's MateFinder receives this information and correlates the received attributes with Bob's preferences. Bob views the degree of correlation and decides whether to have his MateFinder radiate his own attributes. If Alice's MateFinder detects that signal, it correlates the received attributes with her preferences. If she is satisfied with the correlation, she directs her MateFinder to emit an interest signal, and she may also search. If Bob's MateFinder detects the interest signal, he may initiate a search. Eve's and other MateFinders in the area can detect the presence of Alice's and Bob's MateFinders, and can detect the interest signal when emitted.

Figure 15:
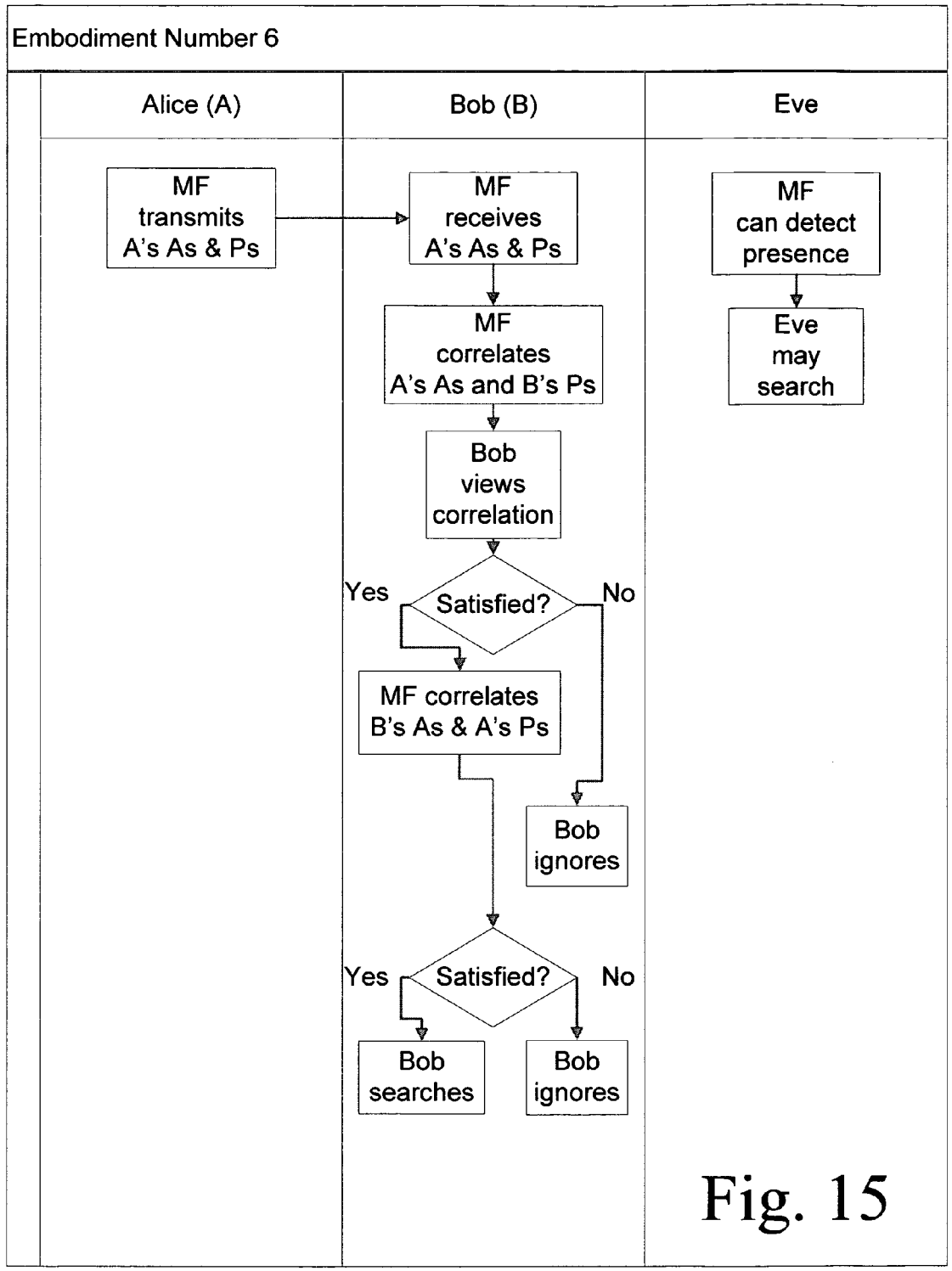

In Embodiment Number 6, shown in FIG. 15, Alice's MateFinder broadcasts both Alice's attributes and her preferences. Bob's MateFinder receives this information and correlates the received attributes with Bob's preferences If Bob is satisfied with the correlation between Alice's attributes and Bob's preferences, he may then have his MateFinder correlate Bob's attributes with the received preferences. Bob views the degree of this second correlation and, if satisfied, may initiate a search. Eve's and other MateFinders in the area can detect the presence of Alice's MateFinder.

Figure 16:
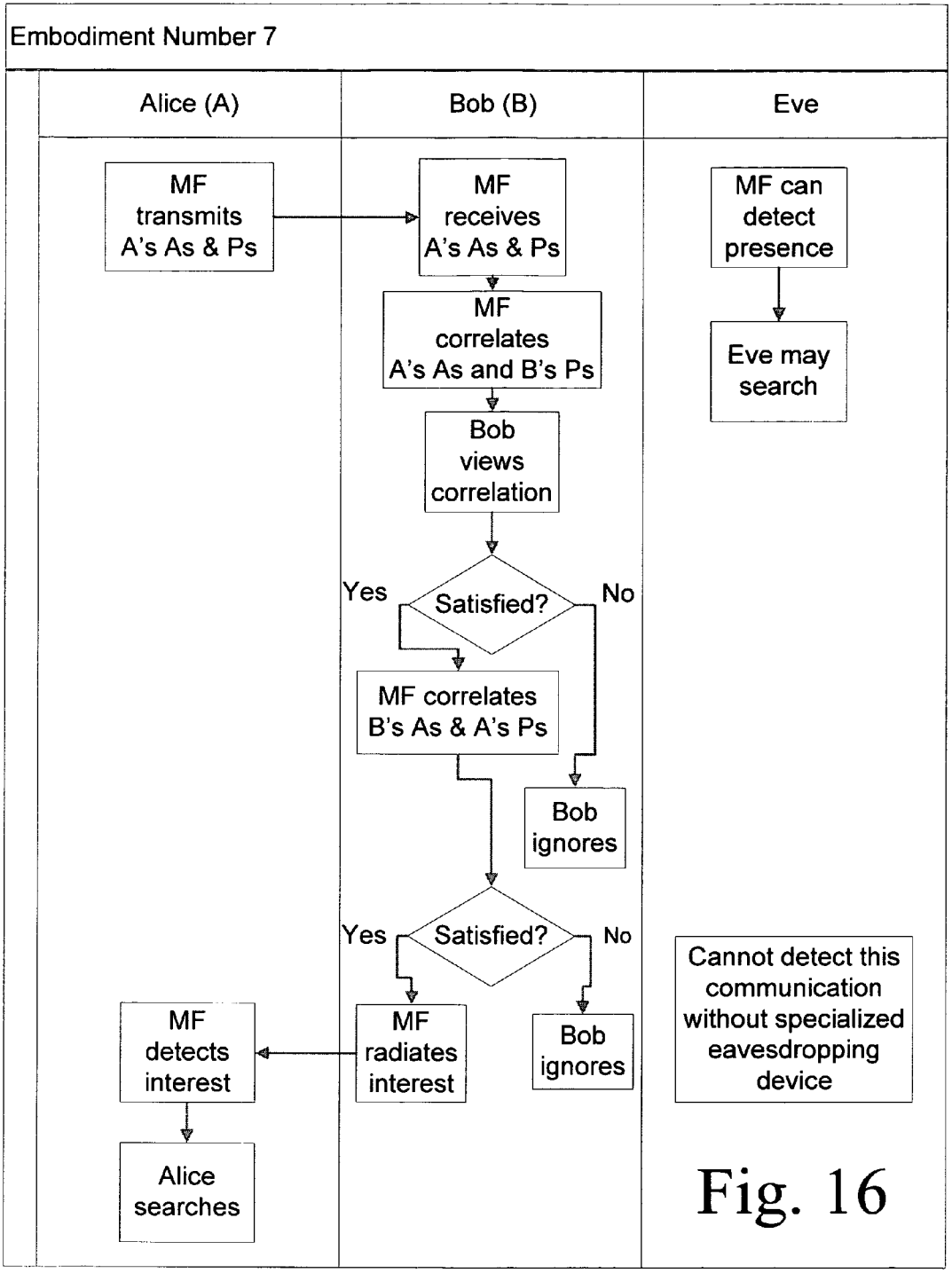

In Embodiment Number 7, shown in FIG. 16, events proceed as shown in FIG. 15, except that Alice's MateFinder adds an encrypted discrete address to her signal. Bob may choose to have his MateFinder radiate an interest signal directed to Alice's MateFinder's address. If Alice's MateFinder detects that signal, she may initiate a search. Eve's and other MateFinders in the area can detect the presence of Alice's and Bob's MateFinders. However, since Bob's interest signal is directed to a discrete address, other MateFinders cannot detect the interest signal.

Figure 17:
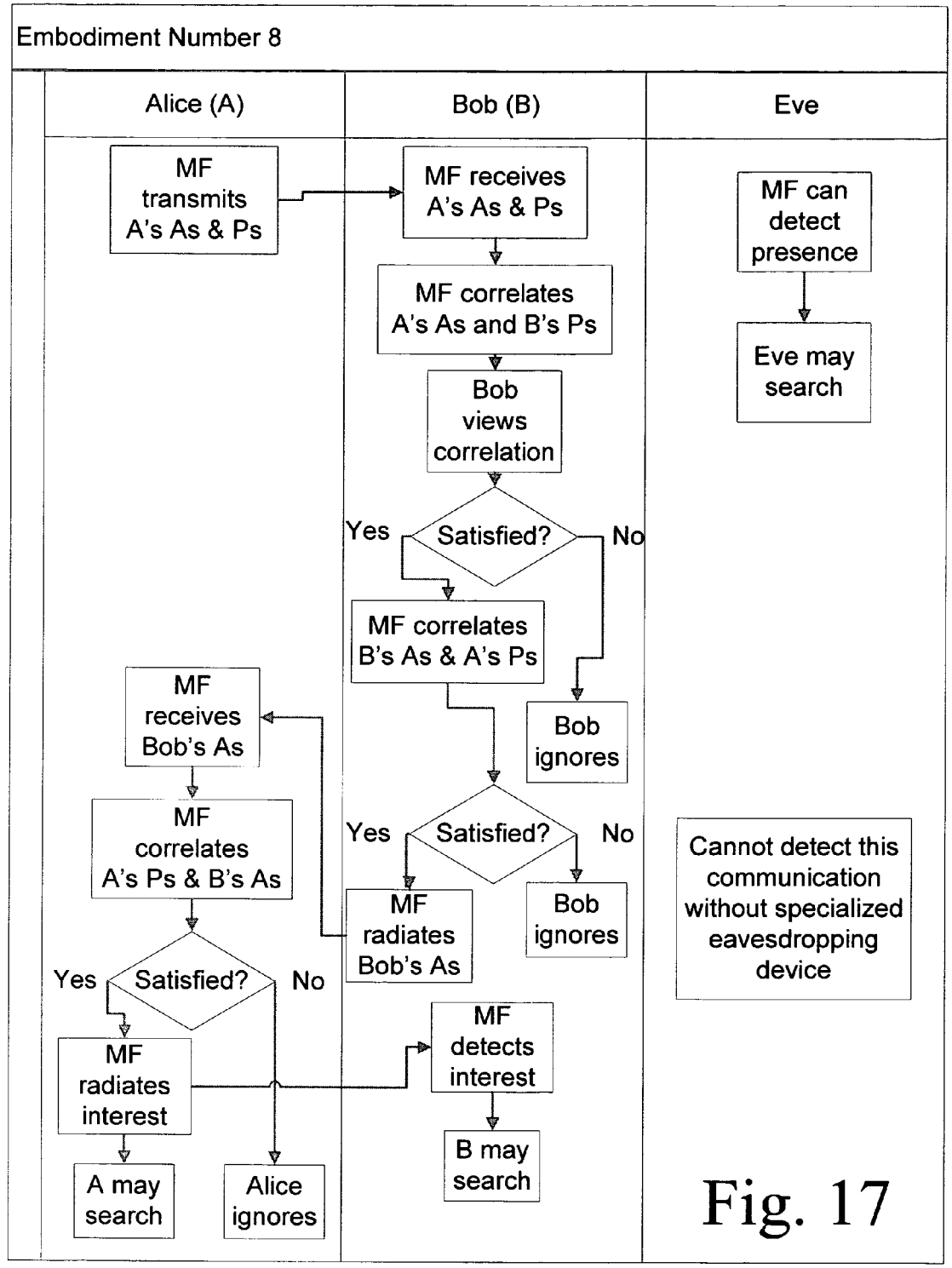

In Embodiment Number 8, shown in FIG. 17, events proceed as shown in FIG. 16, except that Bob may choose to have his MateFinder radiate his own attributes along with its encrypted discrete address. If Alice's MateFinder detects that transmission, it correlates Alice's preferences with the received attributes. If Alice is satisfied with the degree of correlation, she may initiate a search. Eve's and other MateFinders in the area can detect the presence of Alice's and Bob's MateFinders. However, since Alice's interest signal is directed to a discrete address, other MateFinders cannot detect the interest signal.

Figure 18:
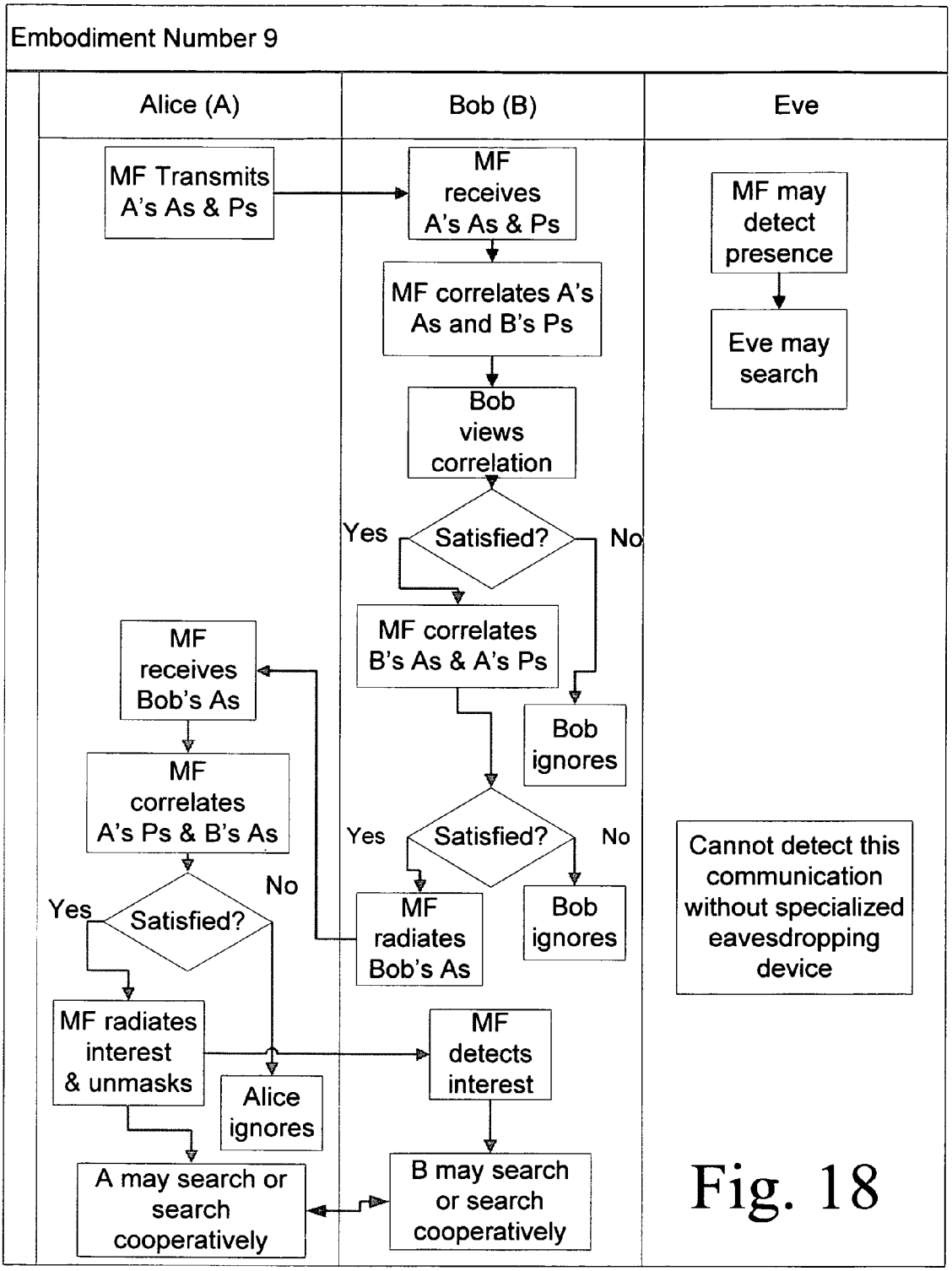

In Embodiment Number 9, shown in FIG. 18, events proceed as shown in FIG. 17, except that Alice may choose to have her MateFinder unmask her location to make her easier to locate, and at the same time to radiate an interest signal directed at the address of Bob's MateFinder. Either Alice or Bob may then decide to initiate a search, or using the location features of their MateFinders, they may choose to search cooperatively. Eve's and other MateFinders in the area can detect the presence of Alice's and Bob's MateFinders. However, since Bob's and Alice's interest signals are directed to the other's discrete address, other MateFinders cannot detect the interest signal.

Figure 19:
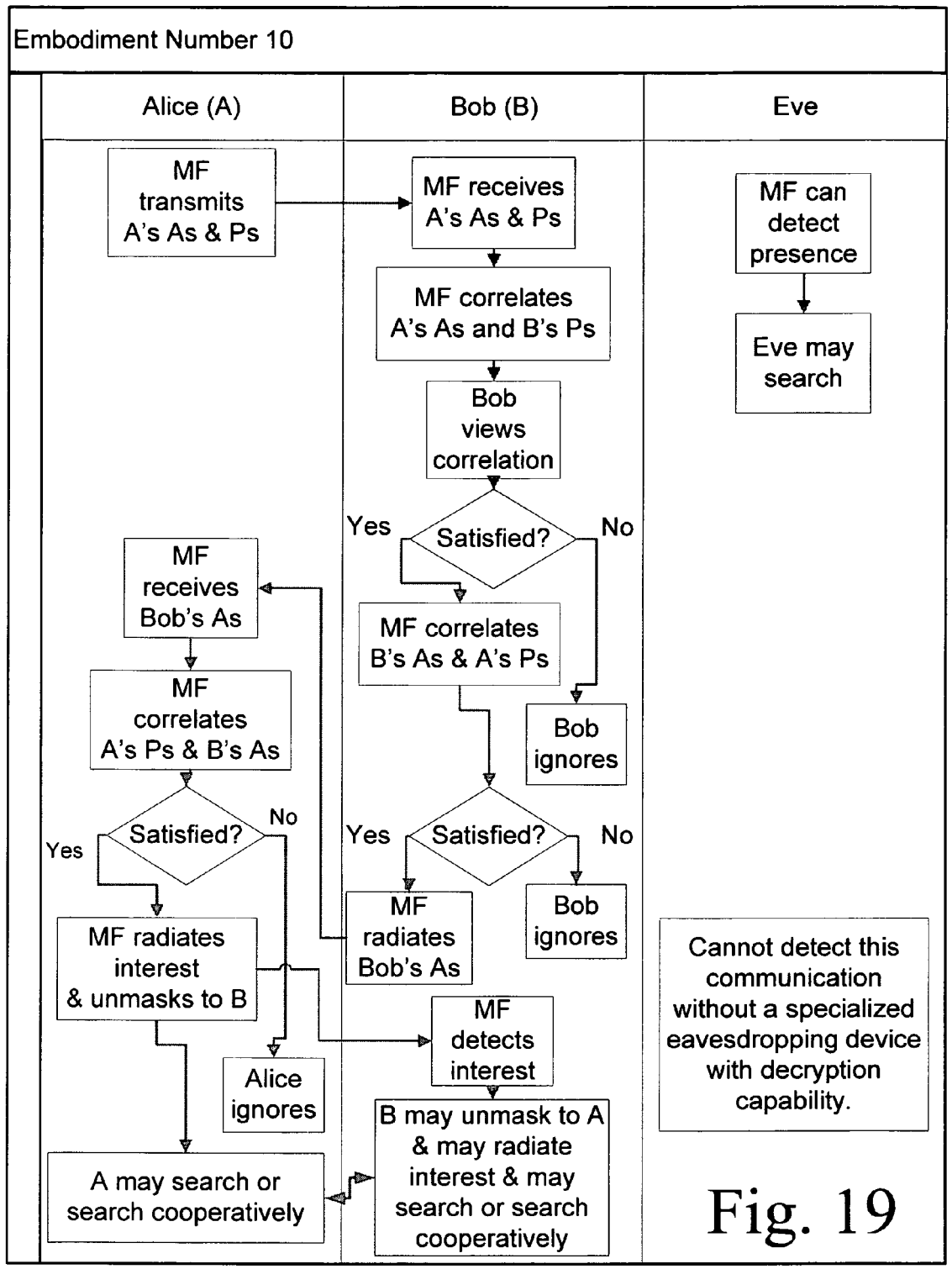

In Embodiment Number 10, shown in FIG. 19, events proceed as shown in FIG. 18, except that Alice may choose to have her MateFinder unmask her location to make her easier to locate, and upon receiving Alice interest signal, Bob may choose to unmask his location to Alice's MateFinder. Either Alice or Bob may then decide to initiate a search, or using the location features of their MateFinders, they may choose to search cooperatively. Eve's and other MateFinders in the area can detect the presence of Alice's and Bob's MateFinders. However, since Bob's interest signal is directed to a discrete address, other MateFinders cannot detect the interest signal. In addition, since unmasking is done only to discrete addresses which may be encrypted, even if equipped with specialized listening equipment, an eavesdropper cannot take advantage of the unmasking.

III. Alternative Embodiments of the Invention

In an alternative embodiment of the invention, the MateFinder™ may be incorporated into or equipped with another electronic device, such as, but not limited to, a cellular telephone, pager, watch, personal digital assistant, Blackberry™, or laptop computer.

In addition to helping people find a mate, the present invention may be employed to find other persons with specific interests or capabilities. As an example, a student in a grammar school could program his FriendFinder™ to seek out other students who are interested in a similar hobby, such as baseball cards or stamp collecting.

In yet another situation, a person who attends a Home Improvement Convention could program his ContractorFinder™ to seek out a person who is skilled at installing home theater equipment or hard wood flooring.

In yet another alternative embodiment, the present invention may be used to find specific objects instead of other people. A shopper in a large retail store could use a ShoppingHelper™ to find the correct aisle or department that offers home appliances or childrens' toys. In general, the present invention encompasses any device or number of devices that use radio signals to locate a person, a place or an object that has been described in data that is stored in one of the devices.

In yet another alternative embodiment, the device can be used by two inanimate objects, such as a crane and a shipping container in a port, to facilitate the crane's operation.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Personal Radio Location System that have been disclosed above are intended to educate the reader about preferred embodiments of the invention, and are not intended to constrain the limits of the invention or the scope of Claims.

LIST OF REFERENCE CHARACTERS

10 MateFinder™
10a Man's MateFinder
10b Woman's MateFinder
11 Interrogation or seeking signal
11a First interrogation signal
11b Second interrogation signal
12 Housing
14 Power switch
15 "Seeking" indicator light
16 "Match Found" indicator light
16a First match indicator
16b Second match indicator
17a Man
17b Woman
18 LCD message screen
19 Website
20 USB port
22 Personal computer
24 USB cable
26 Battery
28 Radio/Processor assembly
30 Antenna
32 Memory
32a First memory
32b Second memory
33 Attribute
33a First set of attributes
33b Second set of attributes
34 Mask switch
35 Correlation thumbwheel
36 Microprocessor
37 Local wireless network
38 Downconverter
40 Amplifier
42 Modulator
44 Upconverter
46 Amplifier
48 Bandpass filter

The invention claimed is:

1. An apparatus comprising:
a first transceiver (10a);
said first transceiver (10a) including a first memory (32a); said first memory (32a) for storing a first attribute (33a) selected by a first user (17a);
said first transceiver (10a) including a first match indicator (16a);
a second transceiver (10b);
said second transceiver (10b) including a second memory (32b); said second memory (32b) for storing a second attribute (33b) selected by a second user (17b);
said second transceiver (10b) including a second match indicator (16b);
said first transceiver (10a) for emitting a first interrogation signal (11a);
said first interrogation signal (11a) being received by said second transceiver (10b);
said first match indicator (16a) on said first transceiver (10a) being activated when said first interrogation signal (11a) finds a match between said first attribute (33a) stored in said first memory (32a) in said first transceiver (10a) and said second attribute (33b) stored in said second memory (32b) in said second transceiver (10b);
said first and said second memories (32a,b) being programmed by a user's interaction with a website (19).

2. A method comprising the steps of:
emitting an interrogation signal (11);
attempting to establish a match between a first attribute (33a) and a second attribute (33b) using said interrogation signal (11);
activating a match indicator (16) when said match is found; and
using a website (19) to select said second attribute (33b).

3. An apparatus comprising:
a first transceiver (10a);
said first transceiver (10a) including a first memory (32a); said first memory (32a) for storing a first attribute (33a) selected by a first user (17a);
said first transceiver (10a) including a first match indicator (16a);
a second transceiver (10b);
said second transceiver (10b) including a second memory (32b); said second memory (32b) for storing a second attribute (33b) selected by a second user (17b);

said second transceiver (10b) including a second match indicator (16b);
said first transceiver (10a) for emitting a first interrogation signal (11a);
said first interrogation signal (11a) being received by said second transceiver (10b);
said first match indicator (16a) on said first transceiver (10a) being activated when said first interrogation signal (11a) finds a match between said first attribute (33a) stored in said first memory (32a) in said first transceiver (10a) and said second attribute (33b) stored in said second memory (32b) in said second transceiver (10b); and
a mask switch (34) for avoiding direction finding.

4. An apparatus comprising:
a first transceiver (10a);
said first transceiver (10a) including a first memory (32a); said first memory (32a) for storing a first attribute (33a) selected by a first user (17a);
said first transceiver (10a) including a first match indicator (16a);
a second transceiver (10b);
said second transceiver (10b) including a second memory (32b); said second memory (32b) for storing a second attribute (33b) selected by a second user (17b);
said second transceiver (10b) including a second match indicator (16b);
said first transceiver (10a) for emitting a first interrogation signal (11a);
said first interrogation signal (11a) being received by said second transceiver (10b);
said first match indicator (16a) on said first transceiver (10a) being activated when said first interrogation signal (11a) finds a match between said first attribute (33a) stored in said first memory (32a) in said first transceiver (10a) and said second attribute (33b) stored in said second memory (32b) in said second transceiver (10b); and
said user (10) employing said website (19) to request a background check;
said first and said second transceivers (10a,b) operating under Part 95 of the Rules of the Federal Communication Commission; and
said first and said second transceivers (10a,b) generating radio waves.

5. An apparatus comprising:
a first transceiver (10a);
said first transceiver (10a) including a first memory (32a); said first memory (32a) for storing a first attribute (33a) selected by a first user (17a);
said first transceiver (10a) including a first match indicator (16a);
a second transceiver (10b);
said second transceiver (10b) including a second memory (32b); said second memory (32b) for storing a second attribute (33b) selected by a second user (17b);
said second transceiver (10b) including a second match indicator (16b);
said first transceiver (10a) for emitting a first interrogation signal (11a);
said first interrogation signal (11a) being received by said second transceiver (10b);
said first match indicator (16a) on said first transceiver (10a) being activated when said first interrogation signal (11a) finds a match between said first attribute (33a) stored in said first memory (32a) in said first transceiver (10a) and said second attribute (33b) stored in said second memory (32b) in said second transceiver (10b);
said user (10) employing said website (19) to request a certification of said first attribute (33a);
said first and said second transceivers (10a,b) operating under Part 95 of the Rules of the Federal Communication Commission; and
said first and said second transceivers (10a,b) generating radio waves.

6. An apparatus comprising:
a first transceiver (10a);
said first transceiver (10a) including a first memory (32a); said first memory (32a) for storing a first attribute (33a) selected by a first user (17a);
said first transceiver (10a) including a first match indicator (16a);
a second transceiver (10b);
said second transceiver (10b) including a second memory (32b); said second memory (32b) for storing a second attribute (33b) selected by a second user (17b);
said second transceiver (10b) including a second match indicator (16b);
said first transceiver (10a) for emitting a first interrogation signal (11a);
said first interrogation signal (11a) being received by said second transceiver (10b);
said first match indicator (16a) on said first transceiver (10a) being activated when said first interrogation signal (11a) finds a match between said first attribute (33a) stored in said first memory (32a) in said first transceiver (10a) and said second attribute (33b) stored in said second memory (32b) in said second transceiver (10b);
said certification being broadcast as part of said interrogation signal (11);
said user (10) employing said website (19) to request a certification of said first attribute (33a);
said first and said second transceivers (10a,b) operating under Part 95 of the Rules of the Federal Communication Commission; and
said first and said second transceivers (10a,b) generating radio waves.

* * * * *